US008002625B2

(12) United States Patent
Maya

(10) Patent No.: US 8,002,625 B2
(45) Date of Patent: Aug. 23, 2011

(54) GAMING DEVICE HAVING GAME WITH SYMBOLS AND ADJACENTLY DISPLAYED COMPLEMENTARY SUB-SYMBOLS

(75) Inventor: Darren Maya, Reno, NV (US)

(73) Assignee: IGT, Reno, NV (US)

( * ) Notice: Subject to any disclaimer, the term of this patent is extended or adjusted under 35 U.S.C. 154(b) by 1160 days.

(21) Appl. No.: 11/558,304

(22) Filed: Nov. 9, 2006

(65) Prior Publication Data

US 2008/0113735 A1 May 15, 2008

(51) Int. Cl.
*A63F 13/00* (2006.01)

(52) U.S. Cl. ........................................ 463/20; 463/21

(58) Field of Classification Search .................... 463/20, 463/21, 23, 25

See application file for complete search history.

(56) References Cited

U.S. PATENT DOCUMENTS 5,224,706 A 7/1993 Bridgeman et al.
5,332,219 A 7/1994 Marnell et al.
5,332,228 A 7/1994 Schultz
5,393,057 A 2/1995 Marnell
5,531,440 A 7/1996 Dabrowski et al.
5,980,384 A 11/1999 Barrie
6,095,921 A 8/2000 Walker et al.
6,120,031 A 9/2000 Adams
6,234,897 B1 * 5/2001 Frohm et al. .................... 463/20
6,261,177 B1 7/2001 Bennett
6,270,411 B1 8/2001 Gura et al.
6,290,600 B1 9/2001 Glasson
6,312,334 B1 11/2001 Yoseloff
6,322,078 B1 11/2001 Adams
6,328,649 B1 12/2001 Randall et al.
6,413,162 B1 7/2002 Baerlocher et al.
6,428,412 B1 8/2002 Anderson et al.
6,494,454 B2 12/2002 Adams
6,517,433 B2 2/2003 Loose et al.
6,554,704 B2 4/2003 Nicastro et al.

(Continued)

FOREIGN PATENT DOCUMENTS

AU 199717601 9/1997

(Continued)

OTHER PUBLICATIONS

Black Swan Paytable Display, written by IGT, published prior to Nov. 9, 2006.

(Continued)

*Primary Examiner* — Peter DungBa Vo
*Assistant Examiner* — Allen Chan
(74) *Attorney, Agent, or Firm* — K&L Gates LLP

(57) ABSTRACT

A gaming device including a plurality of reels or cards having several symbols and a plurality of sub-symbols each associated with one of the several symbols. Each sub-symbol has a designated number of complementary sub-symbols that share at least one characteristic or are otherwise related to such sub-symbol. In one embodiment, when at least two complementary sub-symbols are adjacently displayed, the gaming device transforms the symbols associated with the adjacently displayed complementary sub-symbols into a group wild symbol to allow the player an additional opportunity to obtain a winning symbol combination. In another embodiment, when at least two complementary sub-symbols are adjacently displayed, a bonus award is generated. In another embodiment, when at least two complementary sub-symbols are adjacently displayed, the gaming device transforms the symbols associated with the adjacently displayed complementary sub-symbols into a group multiplier to increase the award for certain winning symbol combinations.

35 Claims, 25 Drawing Sheets

U.S. PATENT DOCUMENTS

| | | | |
|---|---|---|---|
| 6,561,904 | B2 | 5/2003 | Locke et al. |
| 6,565,433 | B1 | 5/2003 | Baerlocher et al. |
| 6,569,015 | B1 | 5/2003 | Baerlocher et al. |
| 6,616,142 | B2 | 9/2003 | Adams |
| 6,638,164 | B2 | 10/2003 | Randall et al. |
| 6,669,559 | B1 | 12/2003 | Baerlocher et al. |
| 6,692,355 | B2 | 2/2004 | Baerlocher et al. |
| 6,719,630 | B1 | 4/2004 | Seelig et al. |
| 6,726,563 | B1 | 4/2004 | Baerlocher et al. |
| 6,749,502 | B2 | 6/2004 | Baerlocher |
| 6,780,109 | B2 | 8/2004 | Kaminkow |
| 6,786,818 | B1 | 9/2004 | Rothschild et al. |
| 6,805,349 | B2 | 10/2004 | Baerlocher et al. |
| 6,805,632 | B2 | 10/2004 | Suda |
| 6,808,454 | B2 | 10/2004 | Gerrard et al. |
| 6,866,583 | B2 | 3/2005 | Glavich et al. |
| 6,878,061 | B2 | 4/2005 | Baerlocher et al. |
| 6,905,406 | B2 | 6/2005 | Kaminkow et al. |
| 6,921,335 | B2 | 7/2005 | Rodgers et al. |
| 6,971,954 | B2 | 12/2005 | Randall et al. |
| 6,981,635 | B1 | 1/2006 | Hughs-Baird et al. |
| 6,997,808 | B2 | 2/2006 | Rodgers et al. |
| 7,040,983 | B2 | 5/2006 | Dolloff et al. |
| 7,056,209 | B2 | 6/2006 | Baerlocher et al. |
| 7,059,967 | B2 | 6/2006 | Baerlocher |
| 7,070,502 | B1 | 7/2006 | Bussick et al. |
| 7,074,127 | B2 | 7/2006 | Cuddy et al. |
| 7,090,580 | B2 | 8/2006 | Rodgers et al. |
| 7,094,148 | B2 | 8/2006 | Baerlocher et al. |
| 7,128,646 | B2 | 10/2006 | Baerlocher et al. |
| 7,137,888 | B2 | 11/2006 | Glavich et al. |
| 7,169,042 | B2 | 1/2007 | Muir et al. |
| 2003/0045354 | A1 | 3/2003 | Giobbi |
| 2003/0060267 | A1 | 3/2003 | Glavich et al. |
| 2003/0064768 | A1 | 4/2003 | Fier |
| 2003/0162585 | A1 | 8/2003 | Bigelow et al. |
| 2003/0203753 | A1 | 10/2003 | Muir et al. |
| 2004/0121838 | A1 | 6/2004 | Hughs-Baird et al. |
| 2004/0171416 | A1 | 9/2004 | Baerlocher et al. |
| 2004/0171420 | A1 | 9/2004 | Baerlocher et al. |
| 2004/0185928 | A1 | 9/2004 | Baerlocher et al. |
| 2004/0242316 | A1 | 12/2004 | Oles et al. |
| 2004/0248641 | A1 | 12/2004 | Jarvis et al. |
| 2005/0020344 | A1 | 1/2005 | Kaminkow |
| 2005/0043081 | A1 | 2/2005 | Baerlocher |
| 2005/0049035 | A1 | 3/2005 | Baerlocher et al. |
| 2005/0054420 | A1 | 3/2005 | Cregan et al. |
| 2005/0054436 | A1 | 3/2005 | Frizzell et al. |
| 2005/0059477 | A1 | 3/2005 | Baerlocher |
| 2005/0059478 | A1 | 3/2005 | Peterson et al. |
| 2005/0064924 | A1 | 3/2005 | Glavich et al. |
| 2005/0148384 | A1 | 7/2005 | Marks et al. |
| 2005/0170876 | A1 | 8/2005 | Masci et al. |
| 2005/0227754 | A1 | 10/2005 | Kaminkow et al. |
| 2006/0019738 | A1 | 1/2006 | Baerlocher |
| 2006/0030392 | A1 | 2/2006 | Rodgers et al. |
| 2006/0063584 | A1 | 3/2006 | Brill et al. |
| 2006/0068875 | A1 | 3/2006 | Cregan et al. |
| 2006/0073876 | A1 | 4/2006 | Cuddy |
| 2006/0084494 | A1 | 4/2006 | Belger et al. |
| 2006/0089191 | A1 | 4/2006 | Singer et al. |
| 2006/0121974 | A1 | 6/2006 | Rodgers et al. |
| 2006/0172795 | A1 | 8/2006 | Bussick et al. |
| 2006/0189364 | A1 | 8/2006 | Baerlocher |
| 2006/0205465 | A1 | 9/2006 | Dolloff et al. |
| 2007/0004489 | A1 | 1/2007 | Rodgers et al. |
| 2007/0010316 | A1 | 1/2007 | Baerlocher et al. |
| 2007/0060248 | A1 | 3/2007 | Rodgers et al. |

FOREIGN PATENT DOCUMENTS

| | | |
|---|---|---|
| AU | 199917318 | 9/1999 |
| EP | 0 410 789 | 2/1990 |
| EP | 0 737 494 | 12/1994 |
| EP | 0 926 645 | 6/1999 |
| EP | 0 944 030 | 9/1999 |
| EP | 1 039 424 | 3/2000 |
| EP | 1 063 622 | 5/2000 |
| WO | WO 97/32285 | 9/1997 |

OTHER PUBLICATIONS

Boot Scootin Article, written by Strictly Slots/Aristocrat Leisure Industries, PTY Ltd., published in Apr. 2001.

Break the Spell Article, written by Strictly Slots/Atronic Casino Technology, Ltd., published in Sep. 2000.

Break the Spell Atronic Web Page, published in Jan. 2001.

Break the Spell Brochure, published in 1999.

Cash Chameleon Article, written by Strictly Slots/Aristocrat Leisure Industries, PTY Ltd.; published in Apr. 2001.

Collector's Treasury of Antique Slot Machines from Contemporary Advertising, written by Peter Bach, published by Post-Era Books in 1980.

Cossack Dance, Advertisement, written by Olympic Video Gaming, published prior to Nov. 9, 2006.

Description of Symbol Feature in Australian UFO Gaming Machine, written by Barcrest Ltd., published in 1995.

Double Diamond Line Advertisement, written by Bally Gaming Systems, published in 2000.

ENCHANTED FOREST™ Gaming Description from Aristocrat, available in 1994.

Enchanted Unicorn Advertisement, written by IGT, published in 2001.

Fishin' Buddies Article, published in Strictly Slots/Anchor Games, published in Apr. 2001.

Happy Camper Advertisement, written by IGT, published in 2001.

Introducing the "Smiling Ape" Machine Advertisement (including Joker's Wild Poker description), written by IGT, published prior to Nov. 9, 2006.

Jackpot Party Brochure and Articles, written by WMS Gaming, Inc, published in 1988.

Joker's Wild Advertisement, written by IGT, published prior to Nov. 9, 2006.

Little Green Men, Jr. Advertisement, written by A.C. Coin and Slot Services Company, published in Apr. 2001.

Loco Loot Article, written by Strictly Slots/Aristocrat Leisure Industries, PTY Ltd., published in May 2002.

Mountain Money Article, written by Strictly Slots/Aristocrat Leisure Industries, PTY Ltd., published in Jun. 2002.

Penguin Pay Advertisement, written by Aristocrat Incorporated, published in 1998.

REEL MAGIC™ Gaming Machine Description, written by IGT, available in 1986.

The Basics of Winning Video Poker (Chapter VI Deuces Wild & Chapter VII Jokers Wild) written by Edward Allen, published in 1990.

Your Real Key to Gaming Success Advertisement (including Roll Over Beethoven and Wild Fortune), written by Olympic Video Gaming, published prior to Nov. 9, 2006.

Wild Streak Advertisement, written by WMS Gaming, Inc., published in 2001.

* cited by examiner

GAMING DEVICE HAVING GAME WITH SYMBOLS AND ADJACENTLY DISPLAYED COMPLEMENTARY SUB-SYMBOLS

This application relates to the following co-pending commonly owned patent applications: "Gaming Device and Method Having Multiple Progressive Award Levels and a Secondary Game for Advancing Through the Progressive Award Levels," Ser. No. 11/462,285; "Gaming Device Having A Game With Primary Symbols, Secondary Symbols Associated With The Primary Symbols And Independently Generated Secondary Symbols," Ser. No. 10/957,013; "Gaming Device Having Wild Indicators," Ser. No. 10/982,096; and "Gaming Device Having Resultant Wild Symbols," Ser. No. 11/149,706.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Many known gaming devices also provide wild symbols or wild cards. Wild symbols provide a player with an additional opportunity to obtain winning symbol combinations. Wild symbols, wild cards and wild indicators in gaming devices also provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that combination. In another example, the gaming scheme is a video poker game. The gaming device displays five cards. The cards are a ten, Jack, Queen, King and wild card. The wild card substitutes as an Ace and provides the player with a winning combination.

To increase player enjoyment and excitement, it is desirable to provide gaming devices having new and different wild symbols, wild indicators, wild card schemes, and bonus awards providable to the player.

SUMMARY

One embodiment of the present disclosure provides a gaming device having a plurality of symbol generators which include a plurality of symbols and a plurality of sub-symbols. In certain embodiments, certain of the plurality of symbols are associated with one or more sub-symbols. In other embodiments, each of the plurality of symbols is associated with one or more sub-symbols. Each sub-symbol is complementary with a designated number of other sub-symbols. In one embodiment, two or more complementary sub-symbols share at least one common characteristic or are otherwise related to each other. When the gaming device adjacently displays a predetermined number of complementary sub-symbols, the gaming device produces a desired outcome. In one embodiment, the desired outcome is transforming the symbols which are associated with the adjacently displayed complementary sub-symbols into a group wild symbol. In another embodiment, the desired outcome is an award provided to the player. In another embodiment, the desired outcome is transforming the symbols which are associated with the adjacently displayed complementary sub-symbols into a group multiplier.

More specifically, in one embodiment, the gaming device transforms the symbols associated with each of the predetermined number of adjacently displayed complementary sub-symbols into a group wild symbol. This embodiment includes symbol generators in the form of a plurality of reels each including a plurality of symbols. The gaming device also includes a plurality of paylines. The gaming device enables a player to place a wager on at least one payline, creating an active payline. The gaming device generates a plurality of symbols on each reel and evaluates whether any winning symbol combinations are displayed. If a winning symbol combination is displayed along any of the active paylines, the gaming device provides an award to the player. In one embodiment, after any awards for any winning symbol combinations are provided, the gaming device determines if the plurality of symbols includes the predetermined number of complementary sub-symbols adjacently displayed on the reels. When the predetermined number of complementary sub-symbols are adjacently displayed, the gaming device transforms each of the symbols associated with the adjacently displayed complementary sub-symbols into a single group wild symbol. In one embodiment, the gaming machine transforms at least two symbols into a single group wild symbol. In one embodiment, at least two symbols are associated with the adjacently displayed complementary sub-symbols. That is, in one embodiment, a pre-determined number of complementary sub-symbols must be associated with at least two symbols. In one embodiment, this group wild symbol functions as individual wild symbols for each of the symbols associated with the adjacently displayed complementary sub-symbols. This group wild symbol can then substitute for any other symbols or a designated group of the symbols of the game. The gaming device evaluates whether any winning symbol combinations are displayed and provides any awards associated with any winning symbol combinations to the player. In one embodiment, if no additional winning symbol combinations result from the group wild symbol, the gaming device provides a consolation award to the player.

In one example of this embodiment, the predetermined number of complementary sub-symbols is four and the complementary sub-symbols are in the form of quadrants of a square. The gaming device enables a player to wager on one or more paylines. The gaming device generates a plurality of the symbols. If any of the generated symbols have associated sub-symbols, those sub-symbols are also displayed. The gaming device evaluates whether any winning symbol combinations exist along the paylines and provides any associated awards to the player. The gaming device determines whether any sub-symbols form the four adjacent quadrants of a square. If so, the gaming device transforms the symbols associated with the adjacently displayed complementary sub-symbols into a group wild symbol. The gaming device evaluates whether any winning symbol combinations are displayed along the paylines and provides any awards for any winning symbol combinations to the player. If no additional winning symbol combinations result from the group wild symbol, the gaming device provides a consolation award of fifty credits to the player.

It should be appreciated that the sub-symbols may be complementary in any suitable manner. In one embodiment, the complementary sub-symbols are in the form of components or pieces of a same shape. In another embodiment, the complementary sub-symbols are in the form of matching shapes. In one embodiment, the complementary sub-symbols are in the form of matching numbers. In another embodiment, the complementary sub-symbols are in the form of shapes with the same color. It should be appreciated that any suitable indicia or image could be used to represent the complementary sub-symbols.

It should also be appreciated that the consolation award (when implemented) may be any suitable award that is provided to the player if no winning symbol combinations result from the group wild symbol. In one embodiment, the consolation award is a predetermined payout. In another embodiment, the consolation award is one or more free games. In another embodiment, the consolation award is an award multiplier of any number for only one or a designated number of symbols associated with the adjacently displayed complementary sub-symbols.

It should further be appreciated that the gaming device may include a plurality of reels, a deck of cards, and any other mechanisms capable of generating symbols in the manner described herein.

In one embodiment, the gaming device transforms each group of symbols associated with a predetermined number of adjacently displayed complementary sub-symbols into a group wild symbol and increases any award provided to the player for any symbols on which two or more group wild symbols overlap. In this embodiment, the gaming device includes a plurality of symbols and a plurality of groups of adjacently displayed complementary sub-symbols on a plurality of reels. In one embodiment, after any awards for any winning symbol combinations are provided to the player, the gaming device determines if the plurality of symbols includes any groups of the predetermined number of complementary sub-symbols adjacently displayed on the reels. For each group of the predetermined number of complementary sub-symbols adjacently displayed, the gaming device transforms the symbols associated with each of the predetermined number of adjacently displayed complementary sub-symbols into a group wild symbol. For any symbols on which two or more group wild symbols overlap, the associated award is multiplied by a predetermined number. The gaming device evaluates whether any winning symbol combinations are displayed along any of the active paylines and provides any awards for any winning symbol combinations to the player.

In one example of this embodiment, the predetermined number of complementary sub-symbols is four and each group of complementary sub-symbols is in the form of matching numbers. The gaming device determines whether any groups of four complementary sub-symbols in the form of matching numbers are adjacently displayed. If so, the gaming device transforms each group of symbols associated with each group of four adjacent matching numbers into a group wild symbol. For any symbols on which two or more group wild symbols overlap, the associated award is multiplied by two. The gaming device evaluates whether any winning symbol combinations are displayed and provides any awards resulting from winning symbol combinations or the overlapping group wild symbols to the player.

It should be appreciated that each group of the predetermined number of complementary sub-symbols may be complementary in a different manner than another group of the predetermined number of adjacently displayed complementary sub-symbols.

It should also be appreciated that the award multiplier for any symbol on which two or more group wild symbols overlap may be any suitable number. In one embodiment, the award multiplier for any symbol on which two or more group wild symbols overlap will be a predetermined number. In another embodiment, the award multiplier for any symbol on which two or more group wild symbols overlap will be the number of group wild symbols that overlap on such symbol. In another embodiment, the award multiplier for any symbol on which two or more group wild symbols overlap will be a randomly generated number.

In one embodiment, the gaming device provides an award to a player when a predetermined number of complementary sub-symbols are adjacently displayed. In this embodiment, the gaming device determines whether a winning combination is displayed along any of the active paylines and determines any awards for any winning symbol combinations. The gaming device determines if the plurality of symbols includes the predetermined number of complementary sub-symbols adjacently displayed on the reels. When the predetermined number of complementary sub-symbols are adjacently displayed, the gaming device generates a bonus award for those complementary sub-symbols.

In one example of this embodiment, the predetermined number of complementary sub-symbols is two, the complementary sub-symbols are in the form of matching numbers, and the bonus award is an award multiplier of two for each symbol associated with the adjacently displayed complementary sub-symbols. The gaming device determines whether two complementary sub-symbols in the form of matching numbers are adjacently displayed. If so, the gaming device multiplies any awards for any symbol combinations including the symbols associated with the adjacently displayed matching numbers by two and adds that award to any award generated from a winning combination on the reels. The gaming device determines a total award and provides such award to the player.

It should be appreciated that the bonus award may be any award that is provided to the player in addition to any award resulting from a winning symbol combination. In one embodiment, the bonus award is one or more free game. In another embodiment, the bonus award is a predetermined payout. In another embodiment, the bonus award is an award multiplier of any number for only one or a designated number of symbols associated with the complementary sub-symbols.

It should be appreciated that the gaming device may determine any awards associated with winning symbol combinations and the bonus award either simultaneously or in any suitable manner. It should also be appreciated that the gaming device may provide any awards associated with winning symbol combinations and the bonus award to the player either simultaneously or in any suitable manner. In one embodiment, the gaming device provides any awards associated with winning symbol combinations first and then provides the bonus award to the player. In another embodiment, the gaming device provides the bonus award and any awards associated with any winning symbol combinations to the player simultaneously (i.e., resulting from one symbol evaluation).

In another embodiment, the gaming device transforms each group of symbols associated with a predetermined number of adjacently displayed complementary sub-symbols into a group multiplier. In this embodiment, the gaming device determines if the plurality of symbols includes the predetermined number of complementary sub-symbols adjacently displayed on the reels. If so, the gaming device transforms each of the symbols associated with the adjacently displayed complementary sub-symbols into a single group multiplier. This multiplier acts as an award multiplier for any winning symbol combinations containing symbols associated with one of the predetermined number of adjacently displayed complementary sub-symbols. The gaming device determines a total award resulting from any winning symbol combinations and the award multiplier and provides such total award to the player.

It is therefore an advantage of the present disclosure to provide a gaming device including group wild symbols that provide a player with an additional opportunity to obtain a winning symbol combination in a game and maximize the award.

It is another advantage of the present disclosure to provide a gaming device including complementary sub-symbols that provide a player with a bonus award in a game when they are adjacently displayed.

It is another advantage of the present disclosure to provide a gaming device including group multipliers that provide a player with an opportunity to increase the award for certain winning symbol combinations in a game.

Other objects, features and advantages of the disclosure will be apparent from the following detailed description, taken in conjunction with the accompanying sheets of drawings, wherein like numerals refer to like parts, elements, components, steps and processes.

DETAILED DESCRIPTION

Gaming Device and Electronics

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
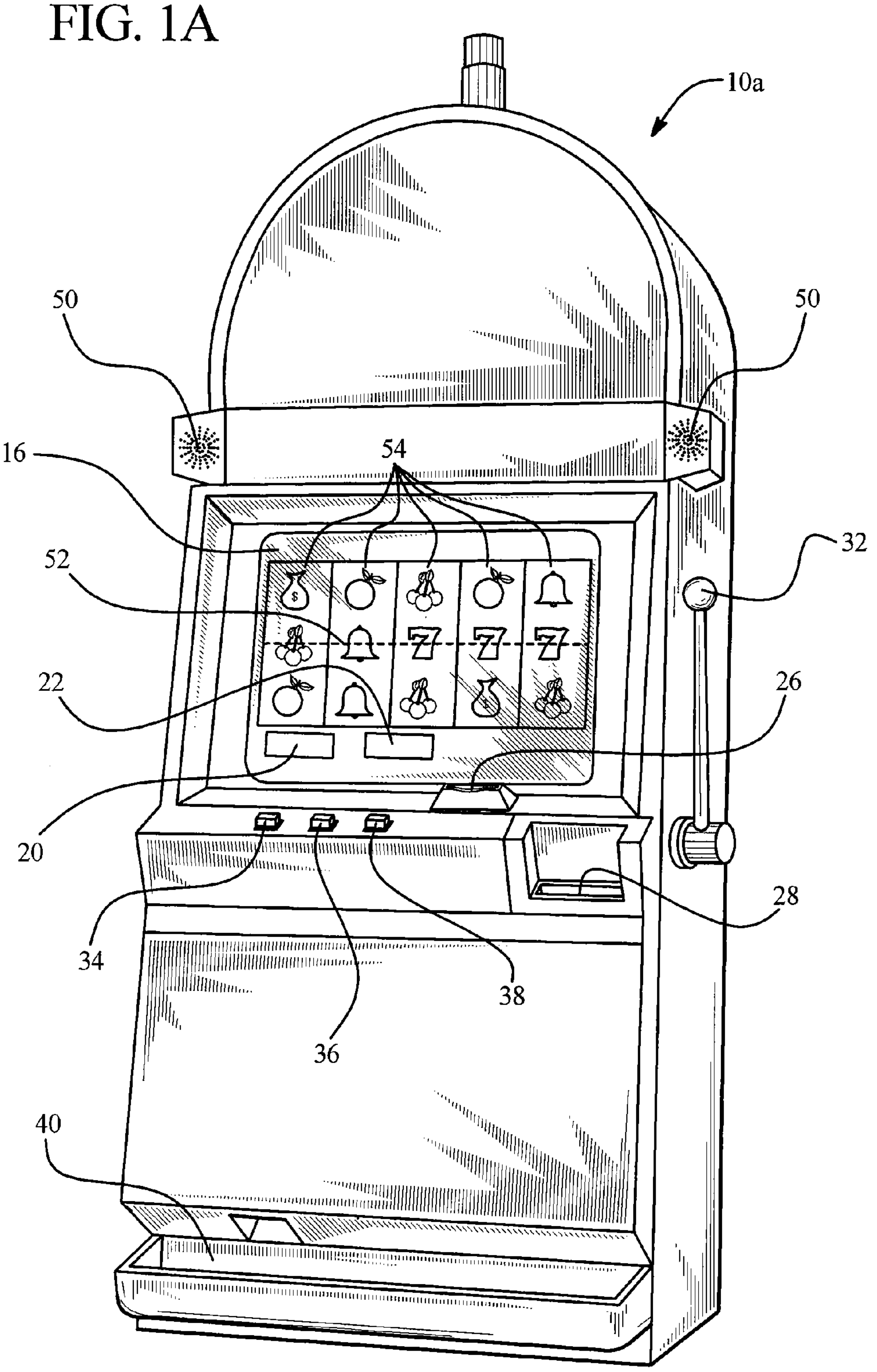
FIG. 1A is a front-side perspective view of one embodiment of the gaming device disclosed herein.
Figure 1B:
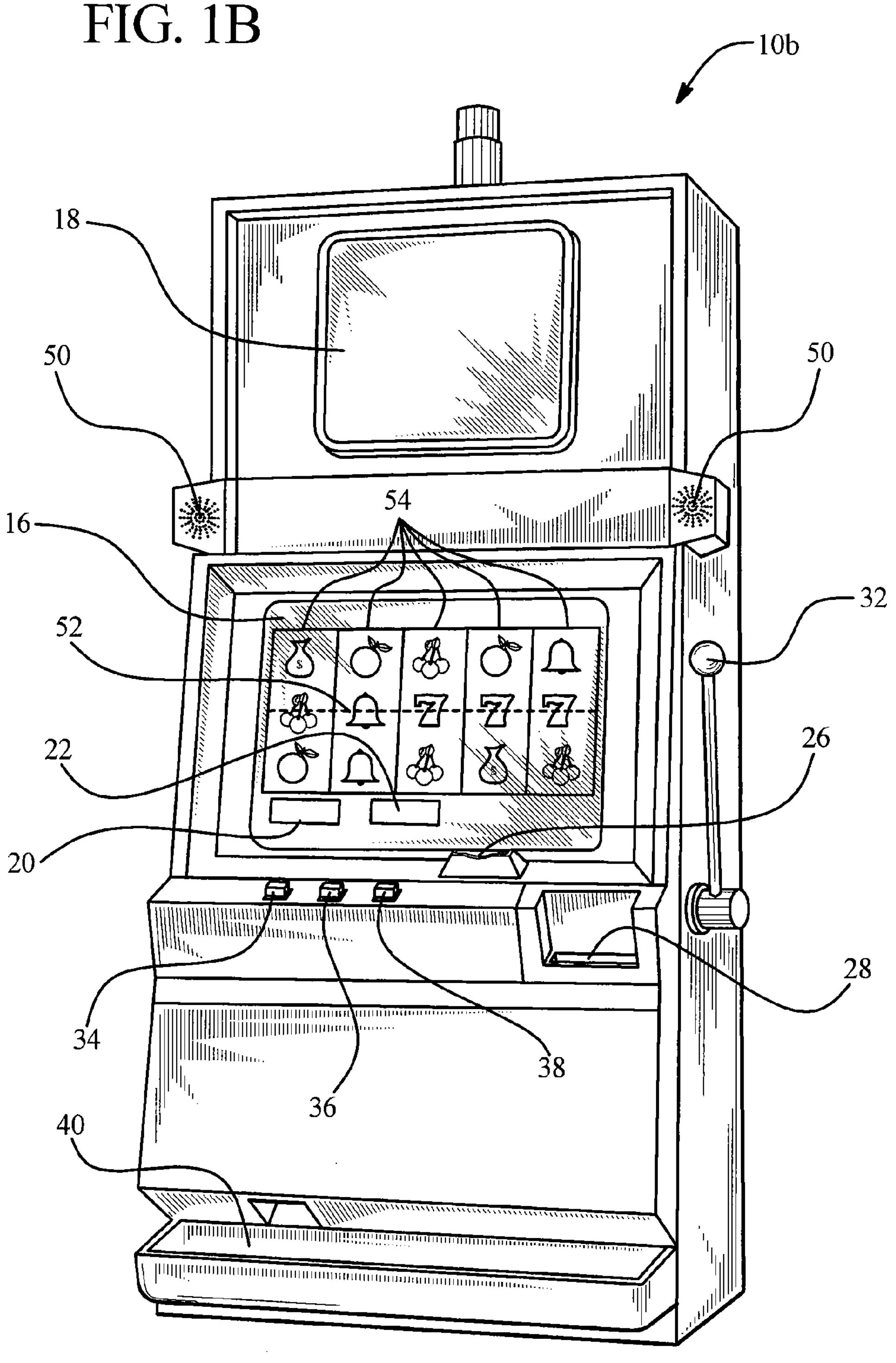
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
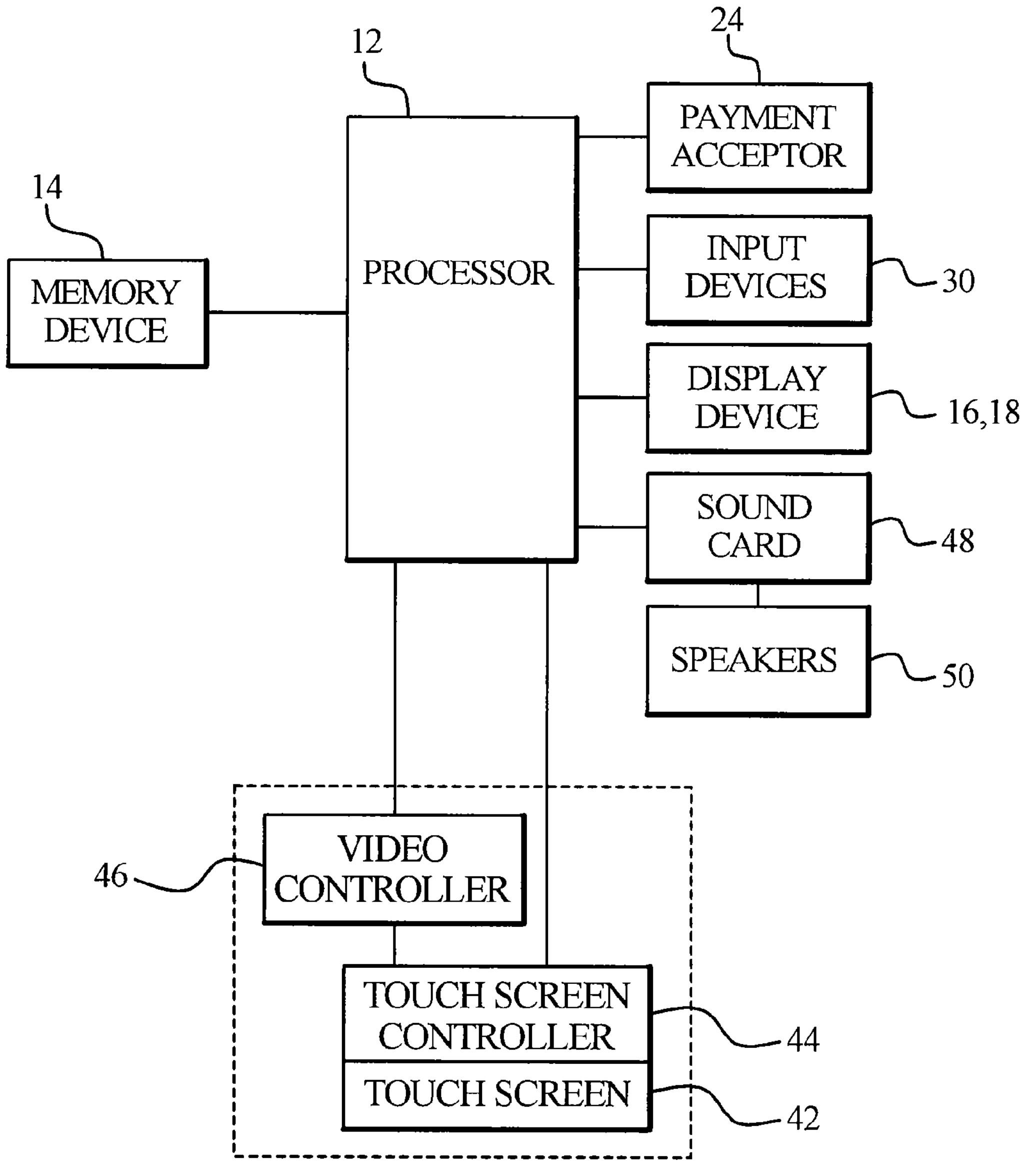
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
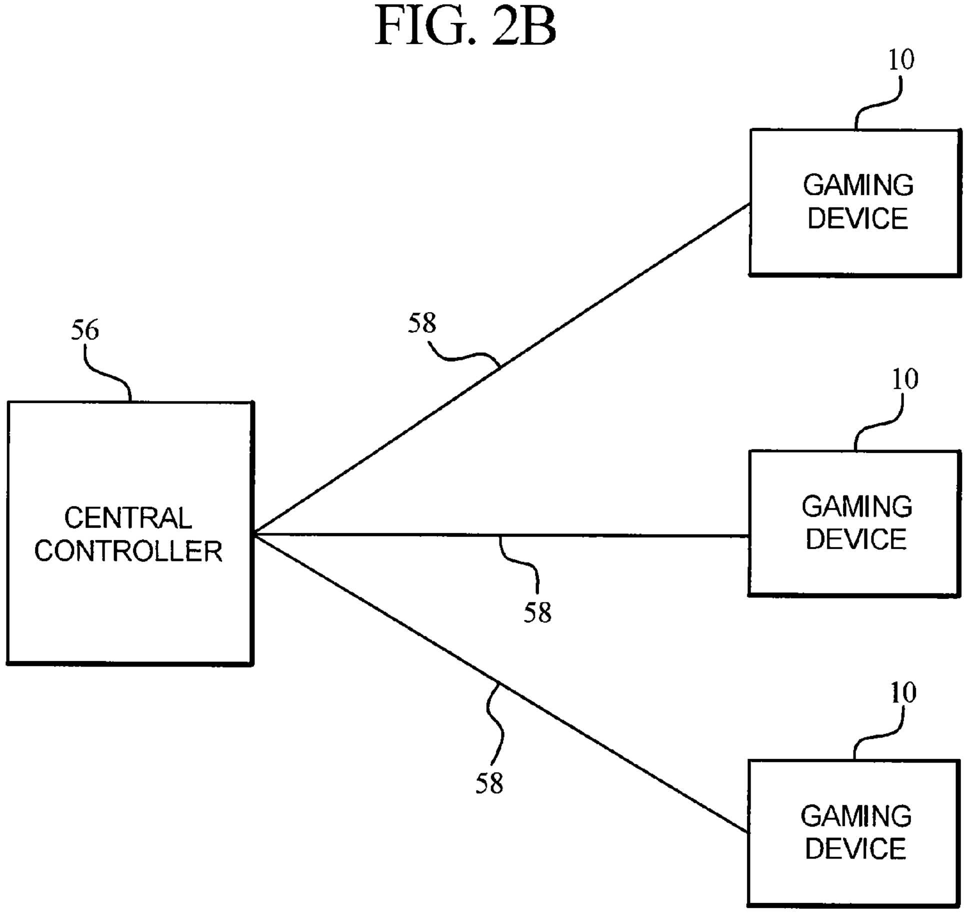
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system hot site computer) determines when a progressive award win is triggered. In another embodiment, an individual gaming machine and a central controller (or progressive gaming system hot site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Complementary Sub-Symbols

Figure 3:
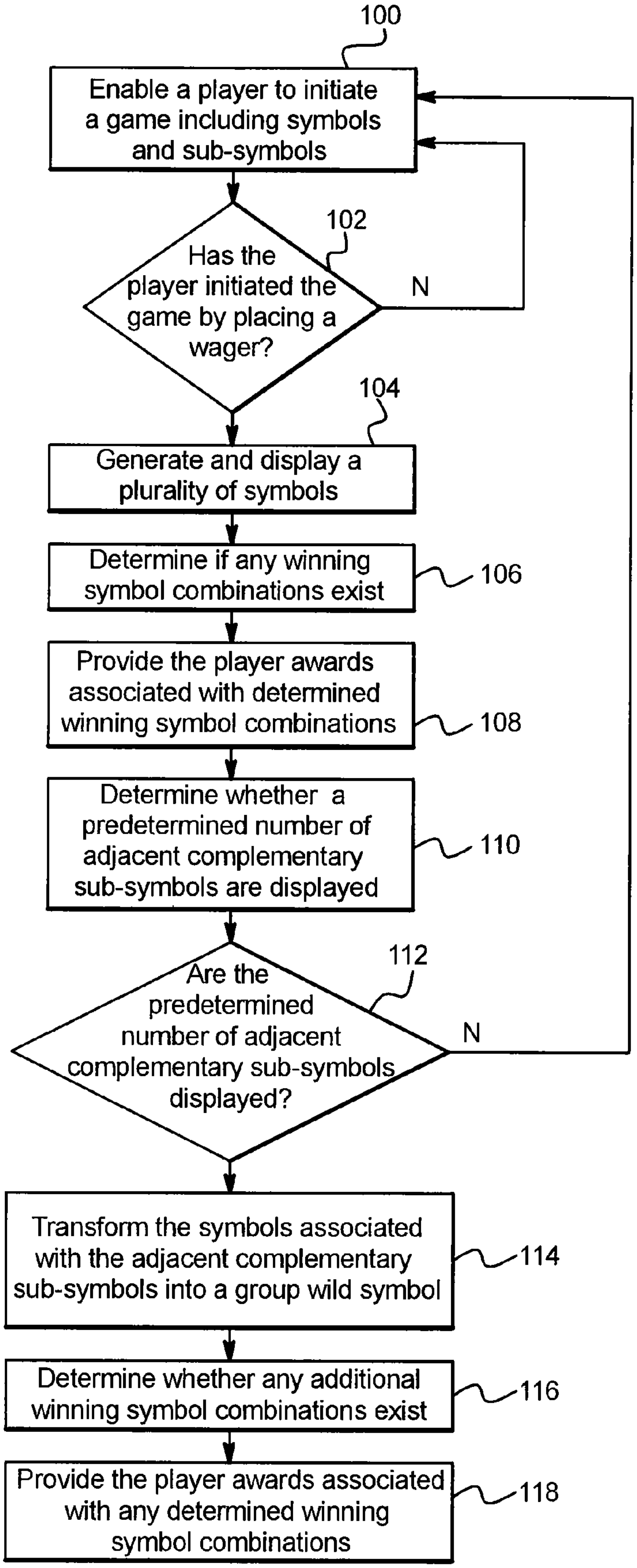
FIG. 3 is a flow chart of the method of one embodiment of the present disclosure illustrating the gaming device determining whether a predetermined number of adjacent complementary sub-symbols are displayed, and if so, forming a group wild symbol to provide a player with an additional opportunity to obtain a winning symbol combination.

Referring now to FIG. 3, in one embodiment, a gaming device determines whether a predetermined number of complementary sub-symbols are adjacently displayed, and if so, transforms the symbols associated with each of the predetermined number of adjacent complementary sub-symbols into a group wild symbol. In this embodiment, the gaming device enables a player to initiate a game including symbols and sub-symbols as indicated in block 100. It should be appreciated that each sub-symbol described herein is complementary to one or more other sub-symbols that share a common characteristic or are otherwise related to such sub-symbol. Once the player has initiated the game by placing a wager as indicated in diamond 102, the gaming device generates and displays a plurality of symbols as indicated in block 104. The gaming device determines if any winning combinations of the symbols are displayed and provides any awards for any determined winning symbol combinations to the player as indicated in blocks 106 and 108. After any awards for any winning symbol combinations are provided, the gaming device determines whether a predetermined number of adjacent complementary sub-symbols are displayed as indicated in block 110. If the predetermined number of adjacent complementary sub-symbols are displayed as indicated in diamond 112, the gaming device transforms the symbols associated with the adjacent complementary sub-symbols into a group wild symbol as indicated in block 114. The gaming device again determines if any winning symbol combinations are displayed and provides any awards for any determined winning symbol combinations to the player as indicated in blocks 116 and 118. In one embodiment, the gaming device includes a dual evaluation. That is, the gaming device determines if any winning combinations of the symbols are displayed and provides any awards for any determined winning symbol combinations to the player. After any awards for any winning symbol combinations are provided, the gaming device determines whether a predetermined number of complementary sub-symbols are adjacently displayed. In another embodiment, the gaming device includes or performs a single evaluation. That is, the gaming device determines if any winning combinations of the symbols are displayed and whether a predetermined number of complementary sub-symbols are adjacently displayed. In one embodiment, this determination is a single process. It should be appreciated that the gaming device may make the determinations in any suitable manner.

FIGS. 4A, 4B, 4C, and 4D illustrate screen shots of one embodiment where the gaming device transforms the symbols associated with each of a predetermined number of adjacently displayed complementary sub-symbols into a group wild symbol. In this embodiment, the gaming device includes a plurality of reels and paylines associated with the reels, where the gaming device enables a player to wager different amounts on a plurality of the paylines. In this illustrated embodiment, a display device 120 displays five video reels 54*a*, 54*b*, 54*c*, 54*d* and 54*e*. The reels include a plurality of symbols 130, 134, 138, 140, 144, 146, 150, 154, 158, 160,

162, 164, 168, 172, and 174. The display device also includes an award indicator or display 122. The display device includes a plurality of paylines which are associated with the symbol positions at which the gaming device generates symbols. The reels also include sub-symbols 132*a*, 136*a*, 142*a*, 148*a*, 152*a*, 152*b*, 152*c*, 152*d*, 156*a*, 156*b*, and 170*a* associated with the symbols as indicated in FIGS. 4C and 4D by the number icons in the corners associated with the symbols. After the player wagers an amount on one or more of the paylines, the gaming device spins the reels and displays a plurality of the symbols. If any of the generated symbols have associated sub-symbols, those sub-symbols are also displayed. In one embodiment, the gaming device determines whether any winning symbol combinations are displayed and provides any awards for any determined winning symbol combinations. When the predetermined number of complementary sub-symbols are adjacently displayed, the gaming device transforms the symbols associated with each of the predetermined number of adjacently displayed complementary sub-symbols into a group wild symbol. The gaming device again evaluates whether any winning symbol combinations are displayed and provides any awards for any determined winning symbol combinations. In this embodiment, the predetermined number of complementary sub-symbols is four.

Figure 4A:
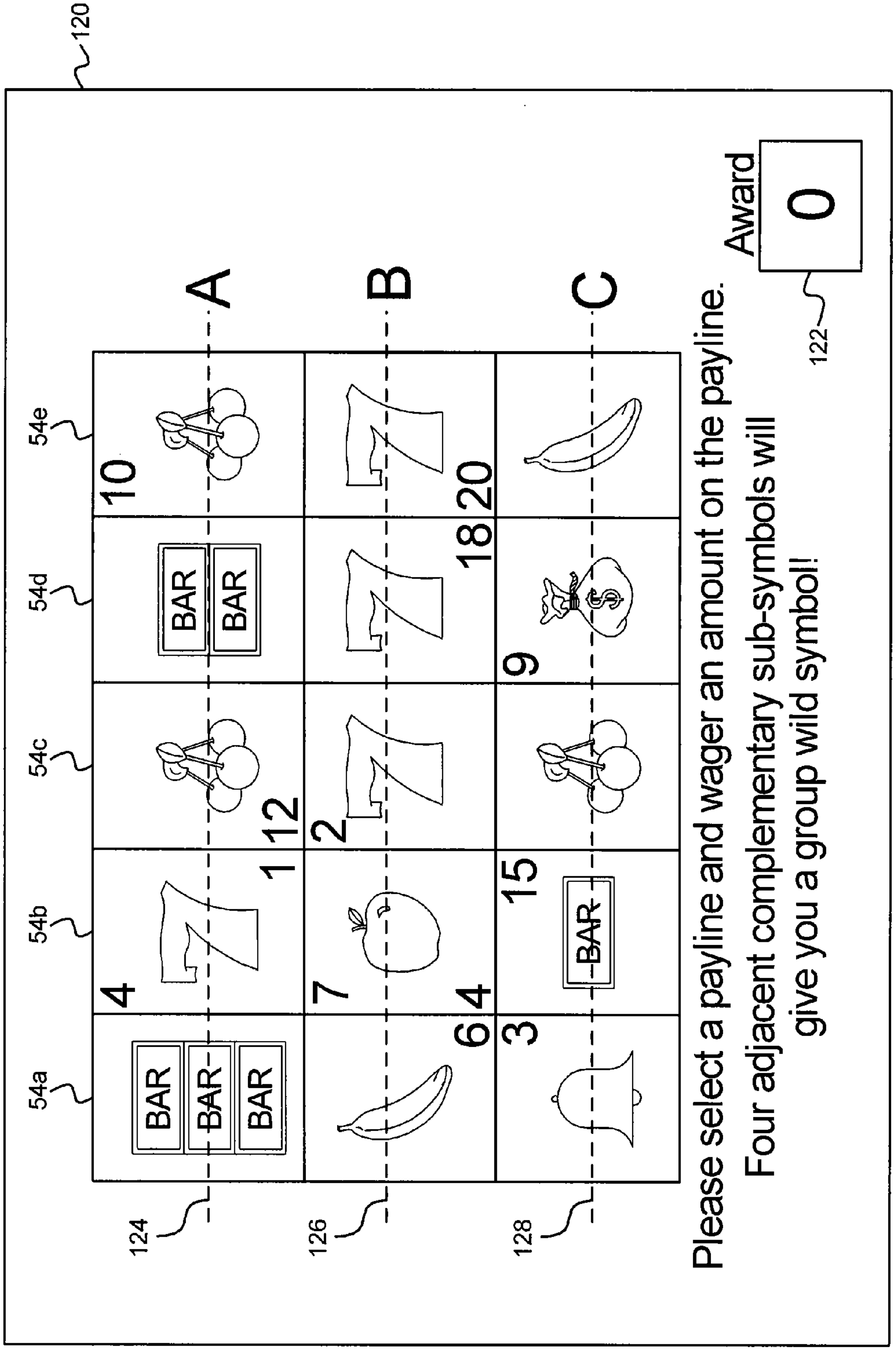
FIGS. 4A, 4B, 4C, and 4D are front elevational views of one embodiment illustrating the gaming device determining whether a predetermined number of complementary sub-symbols are adjacently displayed, and if so, forming a group wild symbol to provide a player with an additional opportunity to obtain a winning symbol combination.
Figure 4B:
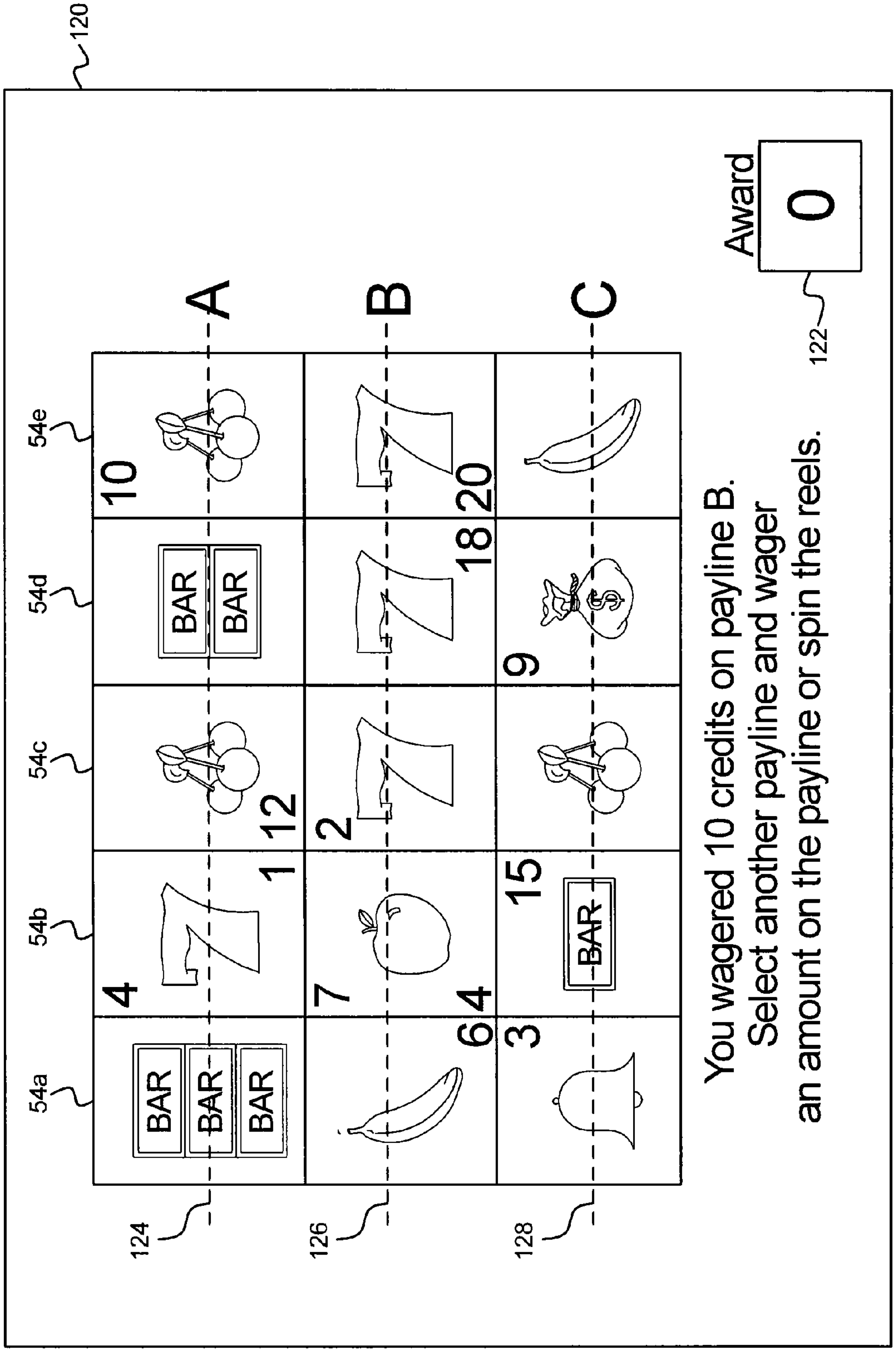
Figure 4C:
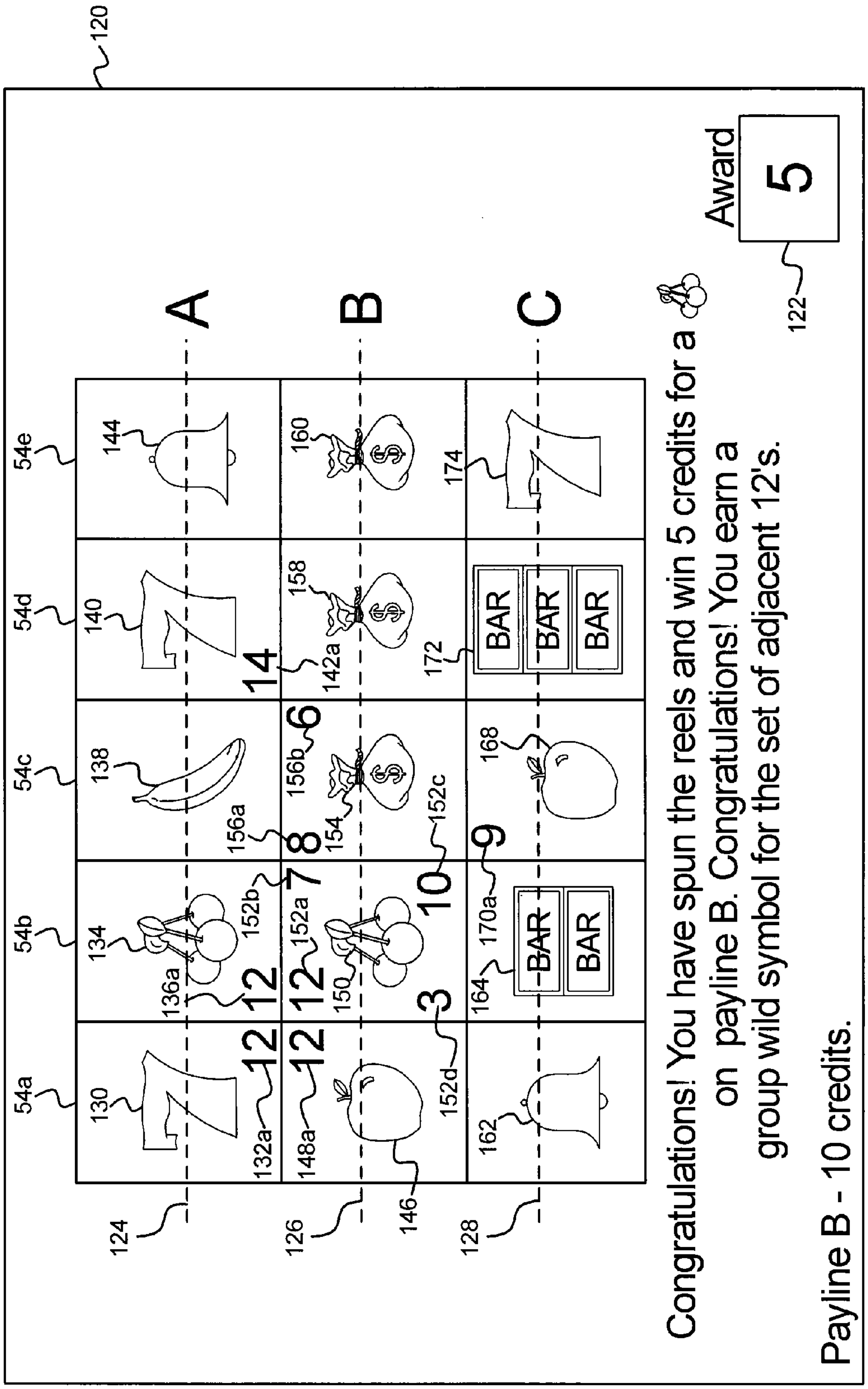
Figure 4D:
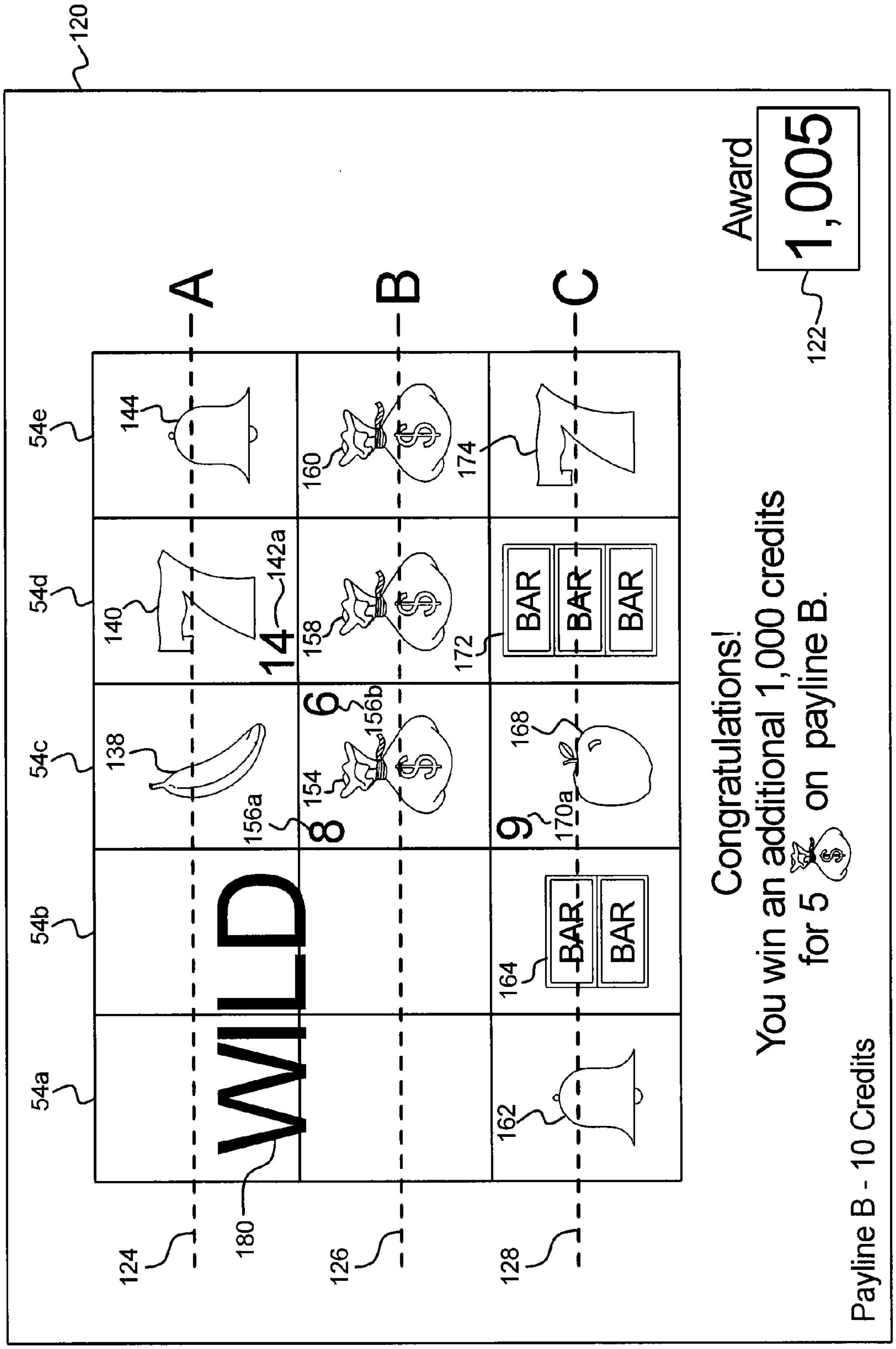

As illustrated in FIG. 4A, the gaming device instructs a player to select a payline and wager an amount on the payline. As illustrated in FIG. 4B, a player selects payline B 126. The gaming device enables the player to wager on payline B 126 and the player wagers ten credits on payline B 126. The gaming device instructs and enables the player to select another payline (if desired) and wager an amount on the selected payline or spin the reels as illustrated in FIG. 4B. It should be appreciated that in one embodiment the gaming device enables the player to wager the same or a different amount on a second payline as the amount wagered on a first payline.

As illustrated in FIG. 4C, the gaming device spins the reels and displays a plurality of symbols and sub-symbols. The plurality of symbols includes symbols 130, 134, 138, 140, 144, 146, 150, 154, 158, 160, 162, 164, 168, 172, and 174. The plurality of sub-symbols includes sub-symbols 132*a*, 136*a*, 142*a*, 148*a*, 152*a*, 152*b*, 152*c*, 152*d*, 156*a*, 156*b*, and 170*a*. The gaming device determines that a winning symbol combination is displayed on payline B 126 and awards the player five credits for the cherry symbol 150. The gaming device determines that the predetermined number of complementary sub-symbols are adjacently displayed by the four complementary sub-symbols 132*a*, 136*a*, 148*a*, and 152*a*. In this embodiment, sub-symbols 132*a*, 136*a*, 148*a*, and 152*a* are complementary because they are all icons representing the same number "12." The display device 120 generates a message indicating that the player has been awarded five credits and a group wild symbol for the adjacent "12" icons and displays the award in award indicator 122.

As illustrated in FIG. 4D, in one embodiment, the gaming device transforms the symbols 130, 134, 146, and 150 associated with the adjacently displayed complementary sub-symbols 132*a*, 136*a*, 148*a*, and 152*a* into a group wild symbol 180. The group wild symbol 180 functions as a wild symbol which substitutes for any symbol, or alternatively for a designated group of symbols, used in the game to maximize the award. In this embodiment, the group wild symbol 180 functions as individual wild symbols for each of the symbols 130, 134, 146, and 150 associated with the adjacently displayed complementary sub-symbols 132*a*, 136*a*, 148*a*, and 152*a*. The group wild symbol 180 accordingly may substitute for as many as four different symbols in the same reel positions as symbols 130, 134, 146, and 150. However, it should be appreciated that the group wild symbol 180 in another embodiment may substitute for only one symbol in each of the reel positions associated with symbols 130, 134, 146, and 150. The selected payline B 126 includes three money bag symbols 154, 158, and 160, and thus the group wild symbol 180 substitutes for two money bag symbols on payline B 126 to create a winning symbol combination of five money bag symbols. The gaming device determines that a winning symbol combination of five money bag symbols is displayed on payline B 126 and provides the player an additional award of one thousand credits. The display device 120 generates a message indicating that the player has been awarded an additional one thousand credits and displays the total award of one thousand and five credits in award indicator 122. In this embodiment, the award associated with five money bag symbols on a selected payline is one thousand credits, and the award associated with a cherry symbol on a selected payline is five credits. However, it should be appreciated that the gaming device may provide any suitable award for any symbol or combination of symbols on the reels.

If the player had wagered on payline A 124, the group wild symbol 180 would also have substituted for two banana symbols on payline A 124 to create a winning symbol combination of three banana symbols. In this embodiment, the award for three banana symbols on a selected payline is one hundred credits, so the player would have been awarded an additional one thousand one hundred credits for a total of one thousand one hundred and five credits.

In a further embodiment, the gaming device provides a consolation award to the player if no additional winning symbol combinations result from the group wild symbol. In such an embodiment, after the player wagers an amount on one or more of the paylines, the gaming device spins the reels and displays a plurality of the symbols. If any of the generated symbols have associated sub-symbols, those sub-symbols are also displayed. The gaming device determines whether any winning symbol combinations are displayed and provides any awards for any winning symbol combinations. The gaming device determines whether the predetermined number of complementary sub-symbols are adjacently displayed and, if so, transforms the symbols associated with each of the predetermined number of adjacently displayed complementary sub-symbols into a group wild symbol. The gaming device evaluates whether any winning symbol combinations are displayed and provides any awards for any determined winning symbol combinations. If no additional awards for winning symbol combinations result from the group wild symbol, the gaming device provides a consolation award to the player.

In another embodiment, if transformation of symbols associated with adjacently displayed sub-symbols into a group wild symbol does result in a win or a winning combination, the gaming device does not transform such symbols. In one embodiment, the gaming device determines if a predetermined number of complementary sub-symbols are adjacently displayed. If the gaming device determines that the predetermined number of complementary sub-symbols are adjacently displayed, the gaming device evaluates whether any winning symbol combinations would be displayed if the symbols associated with such sub-symbols were transformed into a group wild symbol. If a predetermined number of winning symbol combinations, such as one winning symbol combination, would not result from such transformation, the gaming device does not transform the associated symbols. If a predetermined number of winning symbol combinations, such as one winning symbol combination, would result from such transformation, the gaming device transforms the associated symbols.

It should be appreciated that the consolation award may be any suitable award that is provided to the player if no winning symbol combinations result from the group wild symbol. In one embodiment, the consolation award is a predetermined payout. In another embodiment, the consolation award is a free game. In another embodiment, the consolation award is an award multiplier of any suitable number for only one or a designated number of symbols associated with the adjacently displayed complementary sub-symbols.

In an alternative embodiment, the gaming device does not provide any awards for any winning symbol combinations before forming a group wild symbol. In one such embodiment, after the player wagers an amount on one or more of the paylines, the gaming device spins the reels and displays a plurality of the symbols. If any of the generated symbols have associated sub-symbols, those sub-symbols are also displayed. The gaming device determines whether the predetermined number of adjacent complementary sub-symbols are displayed and, if so, transforms the symbols associated with each of the predetermined number of adjacent complementary sub-symbols into a group wild symbol. The gaming device evaluates whether any winning symbol combinations are displayed and provides any awards for any determined winning symbol combinations.

It should be appreciated that the sub-symbols disclosed herein may be complementary in any suitable manner. In one embodiment, the complementary sub-symbols are in the form of components or pieces of a same shape. In another embodiment, the complementary sub-symbols are in the form of matching shapes. In one embodiment, the complementary sub-symbols are in the form of matching numbers. In another embodiment, the complementary sub-symbols are in the form of shapes with the same color. It should be appreciated that any suitable indicia or image could be used to represent the complementary sub-symbols.

Figure 5A:
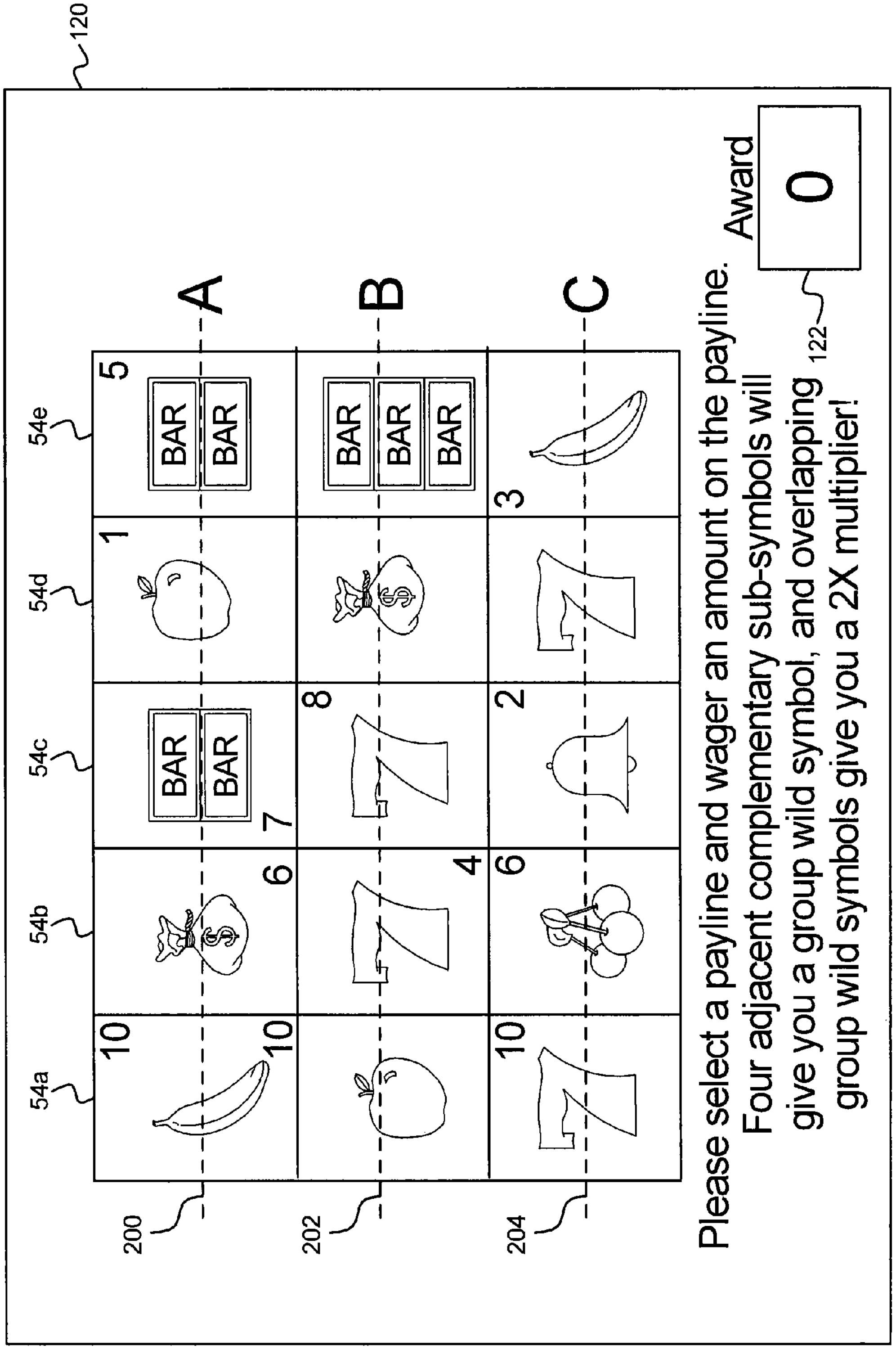
FIGS. 5A, 5B, 5C, 5D, and 5E are front elevational views of one embodiment illustrating the gaming device determining whether a predetermined number of complementary sub-symbols are adjacently displayed, and if so, forming group wild symbols to provide the player with an additional opportunity to obtain a winning symbol combination, then multiplying any awards associated with a symbol on which group wild symbols overlap by two to provide the player with a maximum award.
Figure 5B:
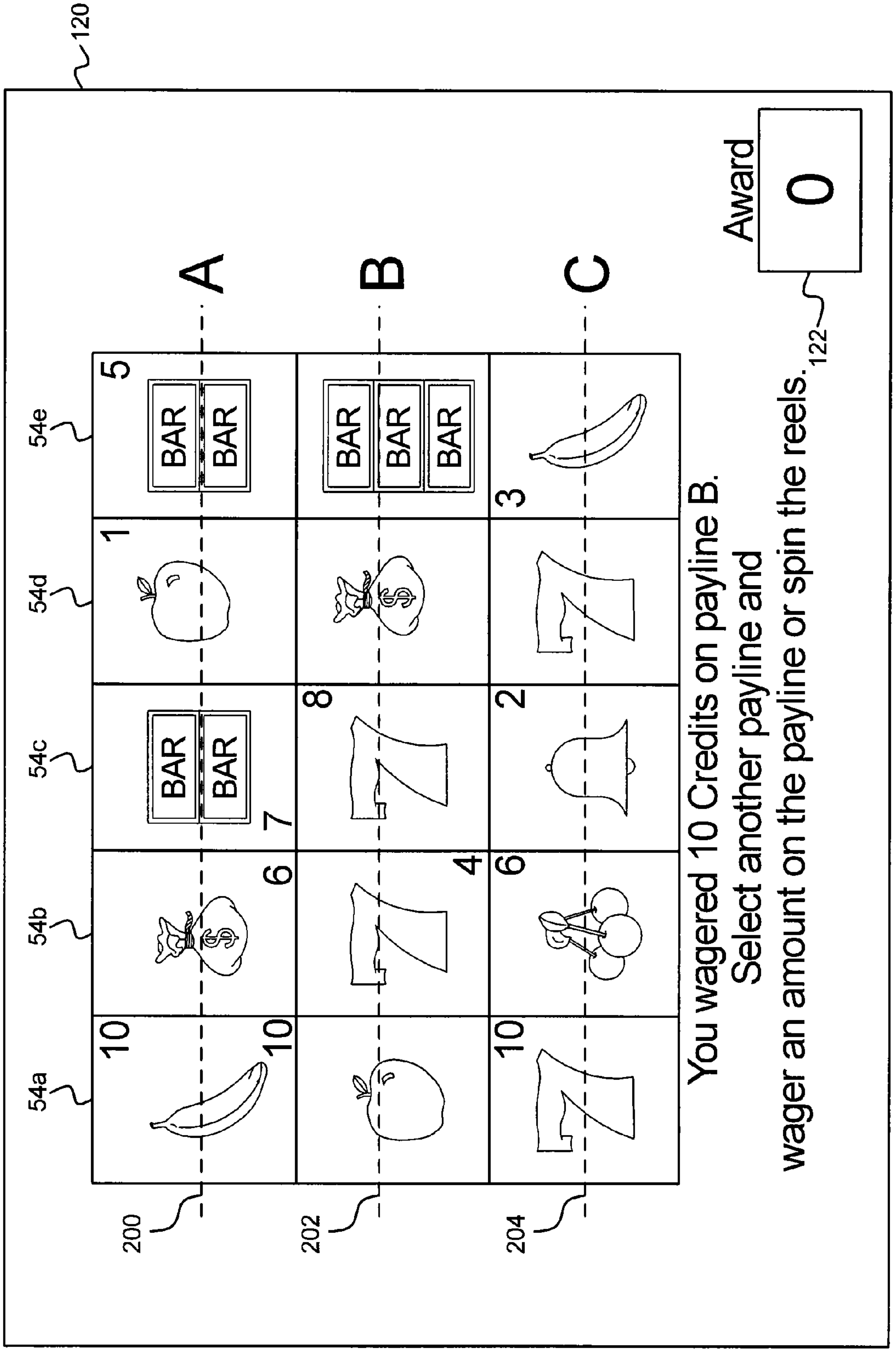
Figure 5C:
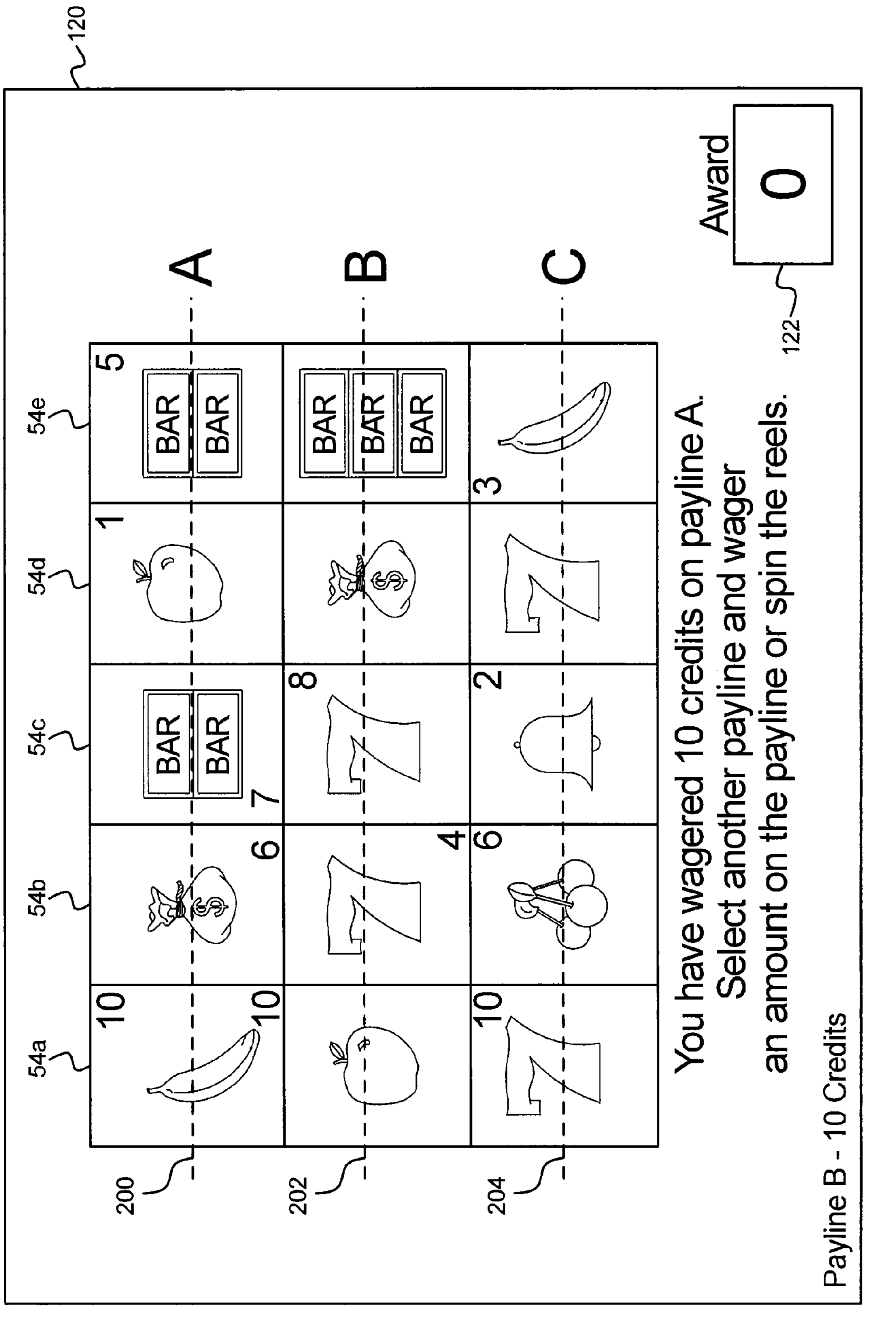
Figure 5D:
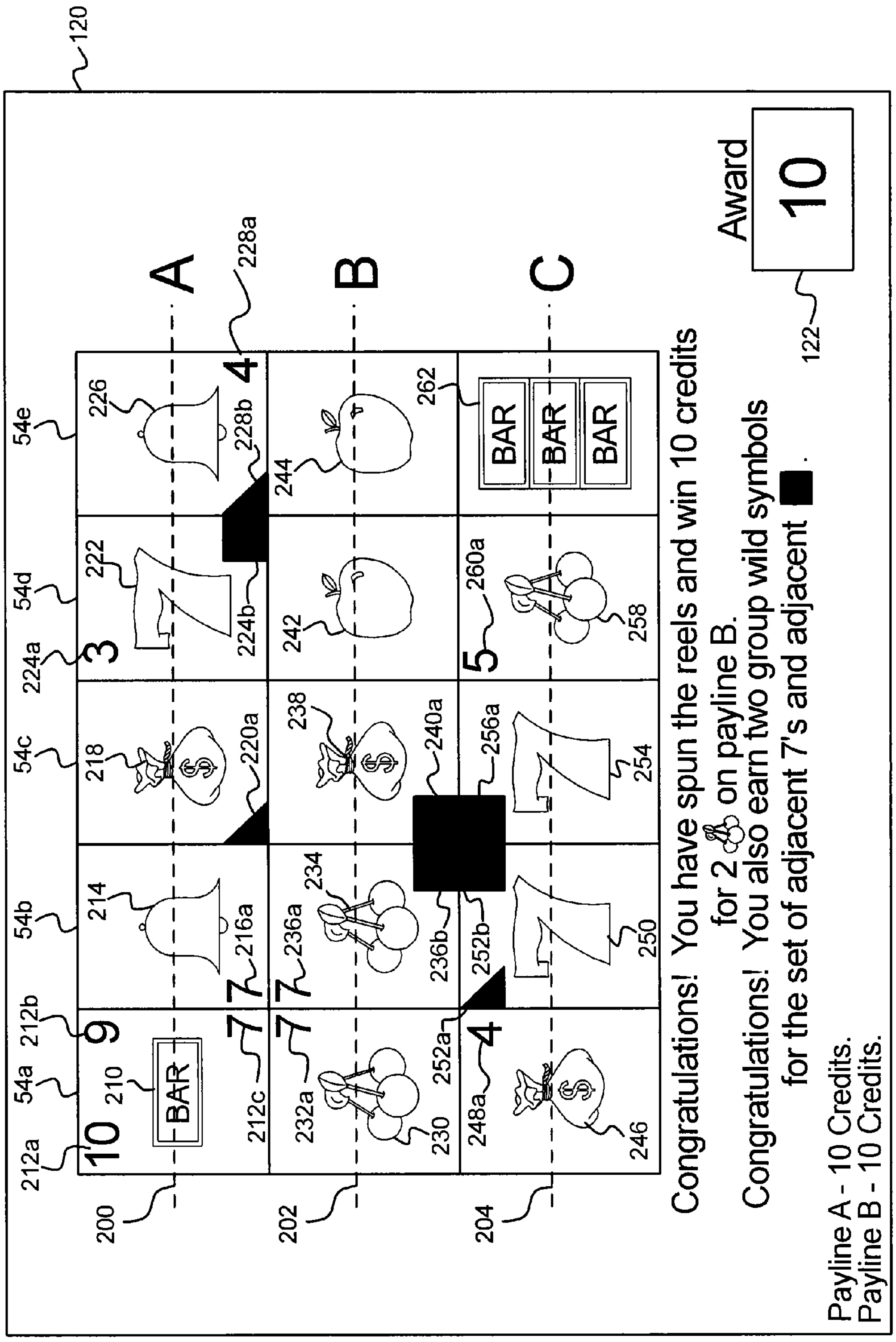
Figure 5E:
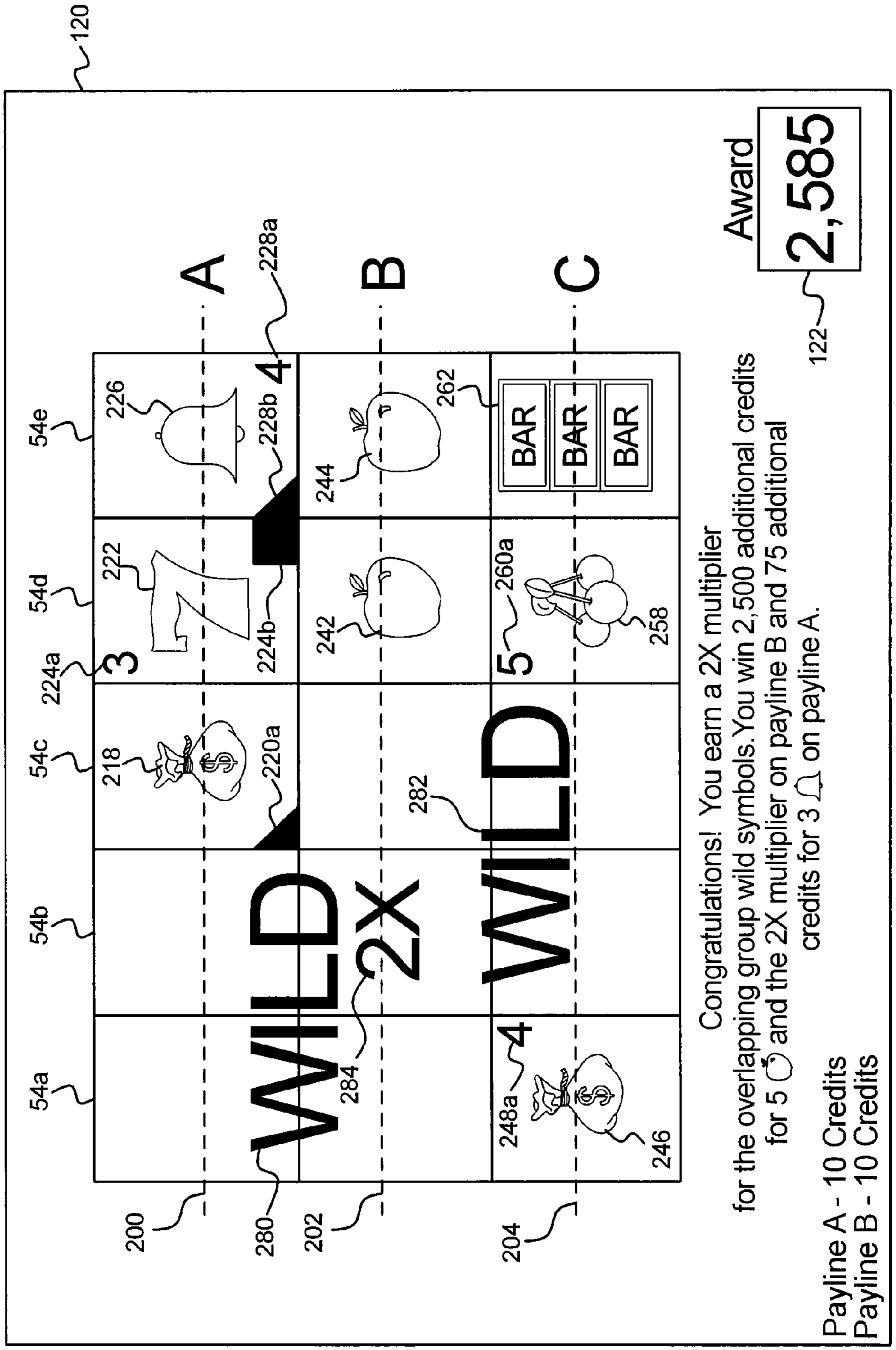

FIGS. 5A, 5B, 5C, 5D, and 5E illustrate screen shots of one embodiment where the gaming device transforms each group of symbols associated with a predetermined number of adjacently displayed complementary sub-symbols into a group wild symbol and increases any award provided to the player for any winning symbol combinations containing symbols on which two or more group wild symbols overlap. In one such embodiment, the gaming device includes a plurality of reels and paylines associated with the reels, where the gaming device enables the player to wager different amounts on a plurality of the paylines. In this illustrated embodiment, a display device 120 displays five video reels 54*a*, 54*b*, 54*c*, 54*d* and 54*e*. The reels include a plurality of symbols 210, 214, 218, 222, 226, 230, 234, 238, 242, 244, 246, 250, 254, 258, and 262. The display device also includes an award indicator or display 122. The display device includes a plurality of paylines which are associated with the symbol positions at which the gaming device generates symbols. The reels also include sub-symbols 212*a*, 212*b*, 212*c*, 216*a*, 220*a*, 224*a*, 224*b*, 228*a*, 228*b*, 232*a*, 236*a*, 236*b*, 240*a*, 248*a*, 252*a*, 252*b*, 256*a*, and 260*a* associated with the symbols as indicated in FIGS. 5D and 5E by the number icons and shapes in the corners associated with the symbols. After the player wagers an amount on one or more of the paylines, the gaming device spins the reels and displays a plurality of the symbols. If any of the generated symbols have associated sub-symbols, those sub-symbols are also displayed. The gaming device determines whether any winning symbol combinations are displayed and provides any awards for any determined winning symbol combinations. For each group of the predetermined number of complementary sub-symbols adjacently displayed, the gaming device transforms the symbols associated with each of these predetermined number of complementary sub-symbols into a group wild symbol. In one embodiment, the associated symbols include at least two symbols. For any symbols on which two or more group wild symbols overlap, any awards for winning symbol combinations containing such symbols is increased. The gaming device determines whether any winning symbol combinations are displayed and provides any associated awards. In this embodiment, the predetermined number of complementary sub-symbols is four and the award for any winning symbol combinations containing symbols on which two or more group wild symbols overlap is multiplied by two.

As illustrated in FIG. 5A, the gaming device instructs a player to select a payline and wager an amount on the payline. As illustrated in FIG. 5B, a player selects payline B 202. The gaming device enables the player to wager on payline B 202 and the player wagers ten credits on payline B 202. The gaming device instructs and enables the player to select another payline (if desired) and wager an amount on the selected payline or spin the reels as illustrated in FIG. 5B. It should be appreciated that in one embodiment the gaming device enables the player to wager the same or a different amount on a second payline as the amount wagered on a first payline. As illustrated in FIG. 5C, the player selects payline A 200. The gaming device enables the player to wager on payline A 200 and the player wagers ten credits on payline A 200. The gaming device instructs and enables the player to select another payline (if desired) and wager an amount on the selected payline or spin the reels as illustrated in FIG. 5C.

As illustrated in FIG. 5D, in one embodiment, the gaming device spins the reels and displays a plurality of symbols and sub-symbols. The plurality of symbols includes symbols 210, 214, 218, 222, 226, 230, 234, 238, 242, 244, 246, 250, 254, 258, and 262. The plurality of sub-symbols includes sub-symbols 212*a*, 212*b*, 212*c*, 216*a*, 220*a*, 224*a*, 224*b*, 228*a*, 228*b*, 232*a*, 236*a*, 236*b*, 240*a*, 248*a*, 252*a*, 252*b*, 256*a*, and 260*a*. The gaming device determines that winning symbol combinations are displayed and awards the player ten credits, five for each of the cherry symbols 230 and 234 on payline B 202. The gaming device determines that two groups of the predetermined number of complementary sub-symbols are adjacently displayed on the reels. A first group is displayed by the four adjacently displayed complementary sub-symbols 212*c*, 216*a*, 232*a*, and 236*a*. A second group is displayed by the four adjacently displayed complementary sub-symbols 236*b*, 240*a*, 252*b*, and 256*a*. In this embodiment, sub-symbols 212*c*, 216*a*, 232*a*, and 236*a* are complementary because they are all icons representing the same number "7." Sub-symbols 236*b*, 240*a*, 252*b*, and 256*a* are complementary because they are all quadrants or components of a square. In another embodiment, sub-symbols 236*b*, 240*a*, 252*b*, and 256*a* are complementary because they are all squares. The display device 120 generates a message indicating that the player has been awarded ten credits for the two cherry symbols 230 and 234 on payline B 202 and two group wild symbols, one for the adjacent "7" icons and one for the adjacent pieces of a square, and displays the award in award indicator 122.

As illustrated in FIG. 5E, the gaming device transforms the symbols 210, 214, 230, and 234 associated with the first group of adjacently displayed complementary sub-symbols 212*c*, 216*a*, 232*a*, and 236*a* into a first group wild symbol 280. The gaming device transforms the symbols 234, 238, 250, and 254 associated with the second group of adjacently displayed complementary sub-symbols 236*b*, 240*a*, 252*b*, and 256*a* into a second group wild symbol 282. Group wild symbols 280 and 282 function as wild symbols which substitute for any symbol or a designated group of symbols used in the game to maximize the award.

In this embodiment, the first group wild symbol 280 functions as individual wild symbols for each of the symbols 210, 214, 230, and 234 associated with the first group of four adjacently displayed complementary sub-symbols 212*c*, 216*a*, 232*a*, and 236*a*. The first group wild symbol 280 accordingly may substitute for as many as four different symbols in the same reel positions as symbols 210, 214, 230, and 234. The second group wild symbol 282 functions as individual wild symbols for each of the symbols 234, 238, 250, and 254 associated with the second group of four adjacently displayed complementary sub-symbols 236*b*, 240*a*, 252*b*, and 256*a*. The second group wild symbol 282 accordingly may substitute for as many as four different symbols in the same reel positions as symbols 234, 238, 250, and 254.

It should be appreciated that, in another embodiment, the first group wild symbol 280 substitutes for only one symbol in each of the reel positions associated with symbols 210, 214, 230, and 234. It should also be appreciated that, in another embodiment, the second group wild symbol 282 substitutes for only one symbol in each of the reel positions associated with symbols 234, 238, 250, and 254.

Group wild symbols 280 and 282 overlap on payline B 202 at reel 54*b*. In one embodiment, the gaming device increases the award associated with the reel position 54*b* on payline B 202, where the group wild symbols 280 and 282 overlap in FIG. 5E, using a multiplier 284. The multiplier 284 multiplies any award associated with the reel position 54*b* on payline B 202 by two. It should be appreciated that the multiplier 284 may multiply any award for any winning symbol combinations containing any symbol or reel position on which two or more group wild symbols overlap by any suitable number or otherwise increase such award in any suitable manner.

The selected payline A 200 includes three different symbols 218, 222, and 226, and thus the first group wild symbol 280 will substitute for two of the same symbol as either symbol 218, 222, or 226 to create a winning symbol combination of three of the same symbol. In this embodiment, the first group wild symbol 280 substitutes for any symbols that maximize the payout to the player. Therefore, since in this embodiment three seven symbols anywhere on an active payline result in an award of twenty-five credits, three money bag symbols anywhere on an active payline result in an award of fifty credits, and three bell symbols anywhere on an active payline result in an award of seventy-five credits, the first group wild symbol 280 will substitute for two bell symbols. It should be appreciated that, in another embodiment, the first group wild symbol 280 substitutes for a symbol adjacent to the first group wild symbol. In one such embodiment, the first group wild symbol 280 substitutes for two money bag symbols. It should be appreciated that the gaming device may be programmed such that a group wild symbol may substitute for any symbol or symbols in any desired manner.

The selected payline B 202 includes two apple symbols 242 and 244, and therefore the first group wild symbol 280 substitutes for one apple symbol on payline B 202 at reel 54*a* and the second group wild symbol 282 substitutes for two apple symbols on payline B 202 at reels 54*b* and 54*c*. It should be appreciated that, alternatively, the first group wild symbol 280 may substitute for two apple symbols on payline B 202 at reels 54*a* and 54*b* and the second group wild symbol 282 may substitute for one apple symbol on payline B 202 at reel 54*c*.

The gaming device determines that a winning combination of three bell symbols is displayed on payline A 200 and a winning combination of five apple symbols is displayed on payline B 202. In this embodiment, the award associated with three bell symbols on a selected payline is seventy-five credits, and the award associated with five apple symbols on a selected payline is one thousand two hundred and fifty credits. The multiplier 284 multiplies the award for five apple symbols by two for a total of two thousand five hundred credits, because the multiplier 284 is located on a symbol associated with the winning symbol combination. The display device 120 generates a message indicating that the player has been awarded an additional two thousand five hundred and seventy-five credits, seventy-five for three bell symbols on payline A 200 and two thousand five hundred for five apple symbols and the 2× multiplier on payline B 202. The gaming device displays the total award of two thousand five hundred and eighty-five credits in award indicator 122.

Figure 6A:
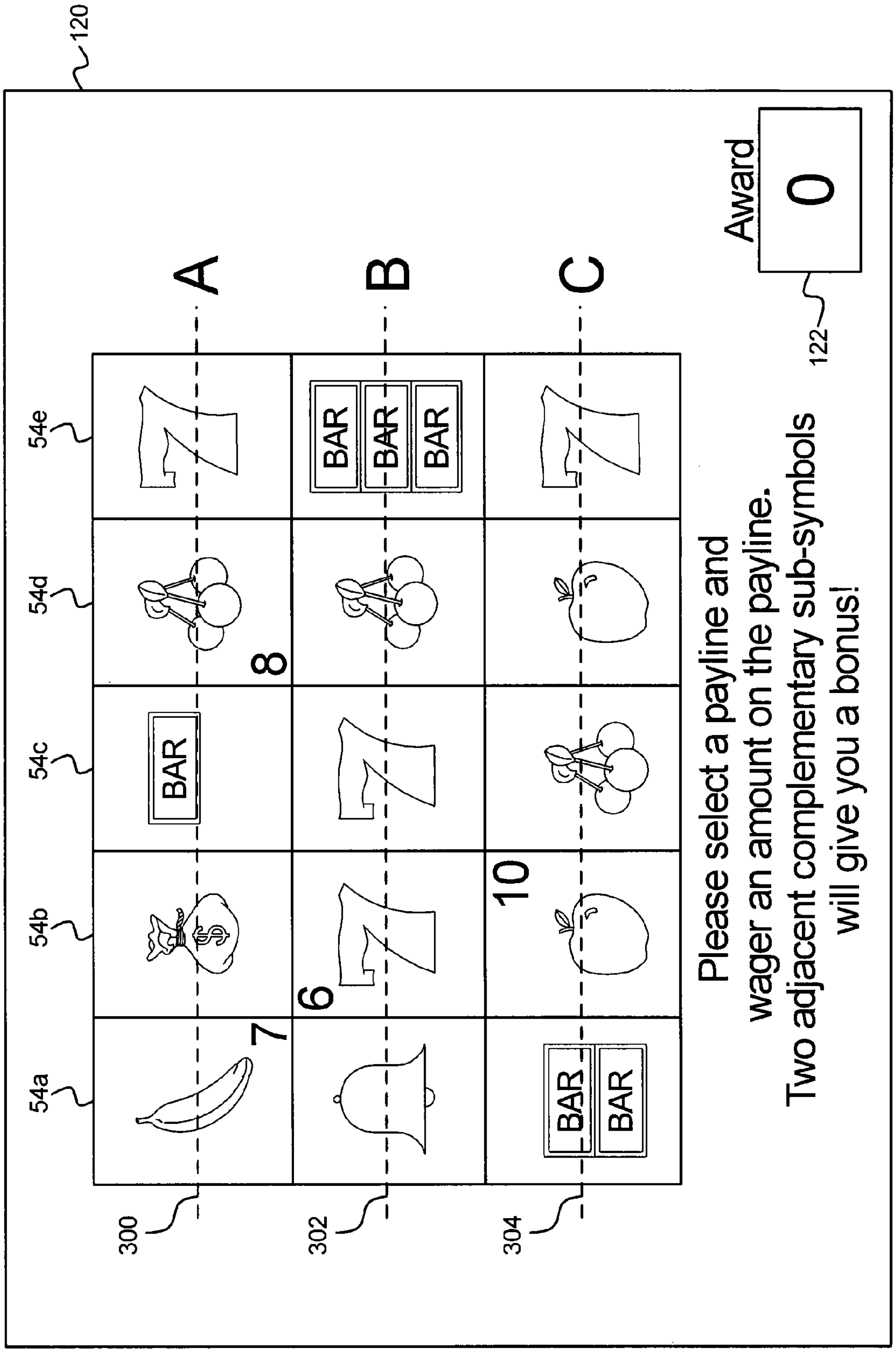
FIGS. 6A, 6B, and 6C are front elevational views of one embodiment illustrating the gaming device determining whether a predetermined number of complementary sub-symbols are adjacently displayed and, if so, providing any bonus awards to a player.
Figure 6B:
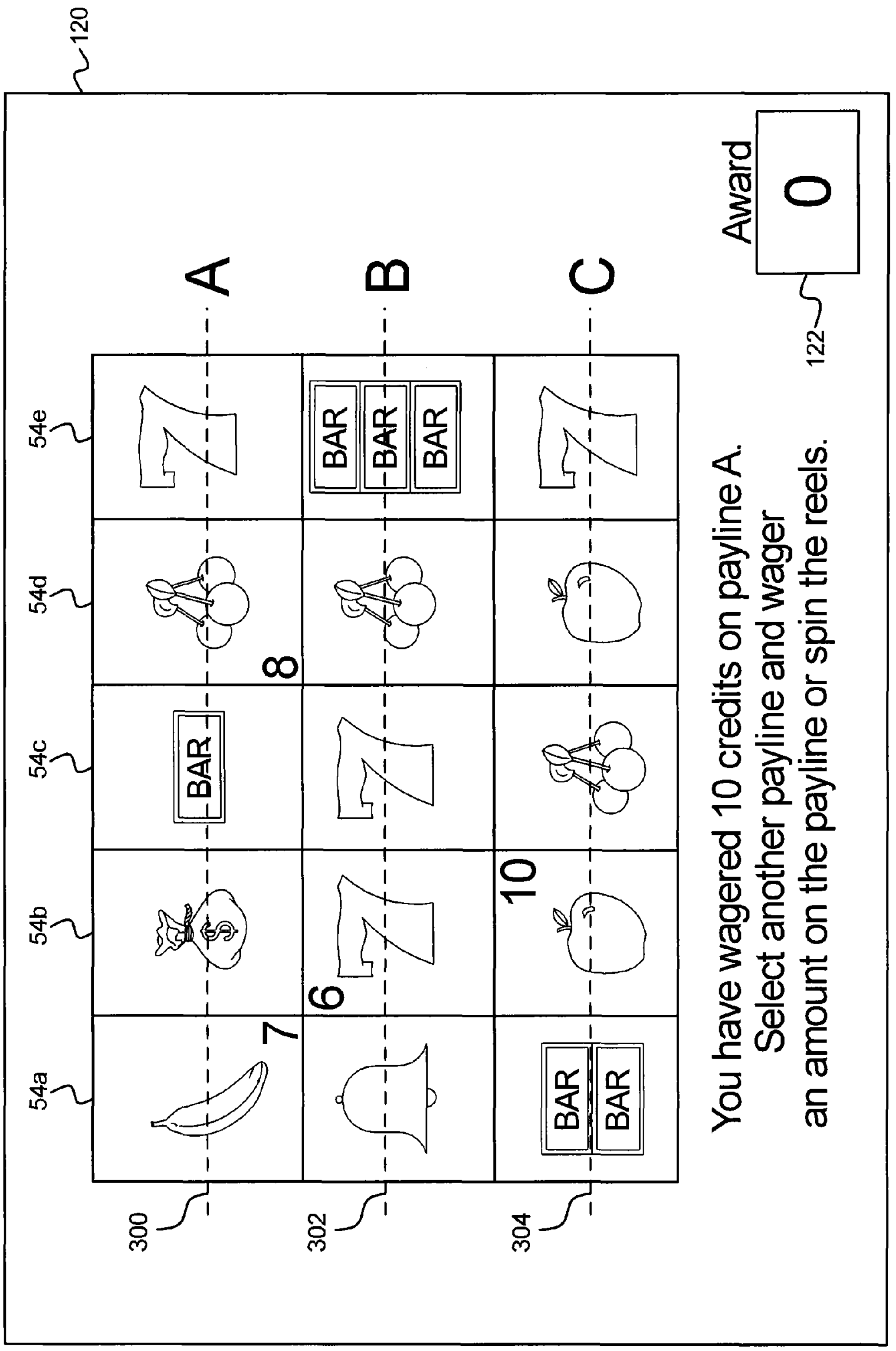
Figure 6C:
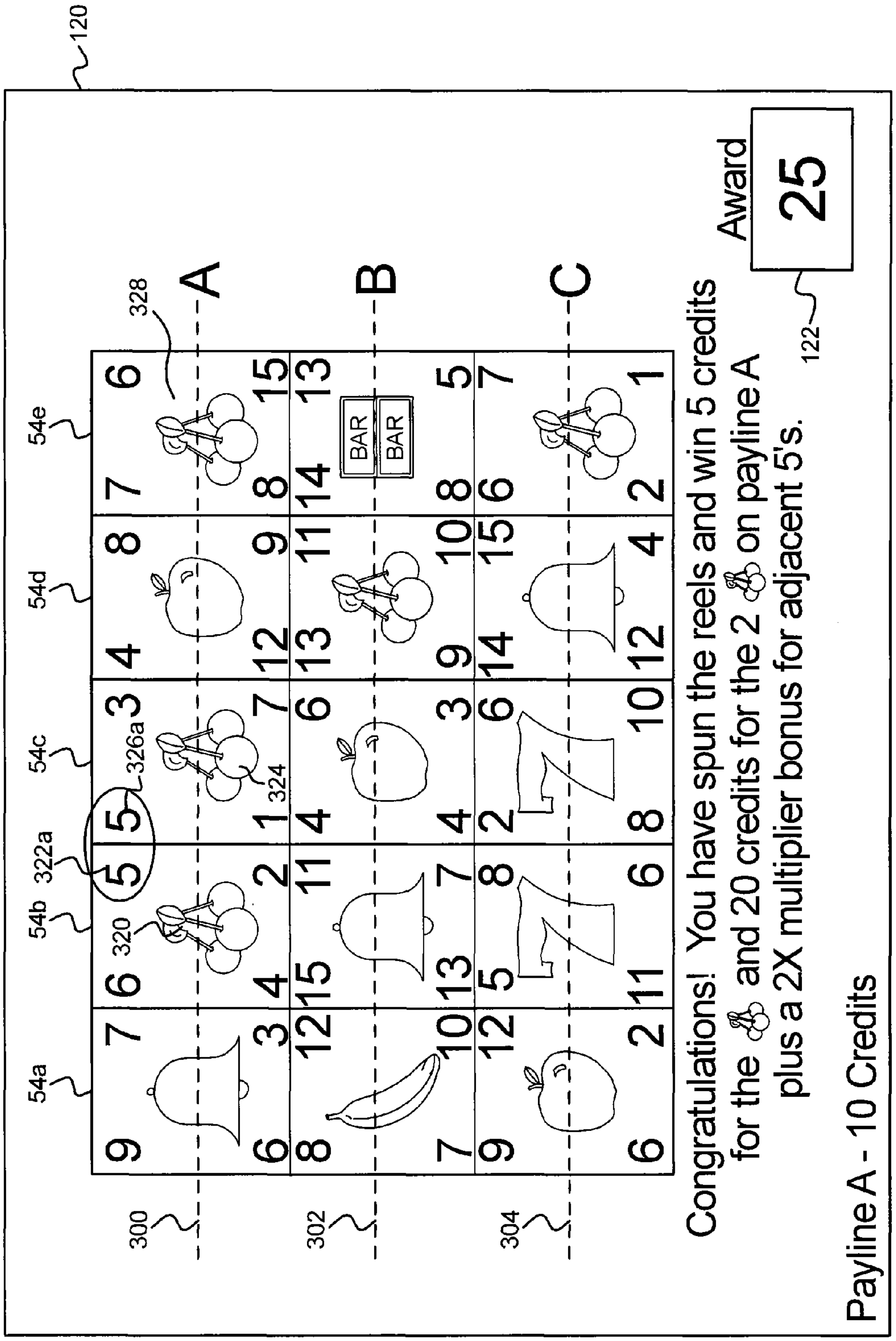

FIGS. 6A, 6B, and 6C illustrate screen shots of one embodiment where the gaming device generates a bonus award when a predetermined number of complementary sub-symbols are adjacently displayed. In this embodiment, the gaming device includes a plurality of reels and paylines associated with the reels, where the gaming device enables the player to wager different amounts on a plurality of the paylines. In this illustrated embodiment, a display device 120 displays five video reels 54*a*, 54*b*, 54*c*, 54*d* and 54*e*. The reels include a plurality of symbols 320, 324, and 328. The display device also includes an award indicator or display 122. The display device includes a plurality of paylines which are associated with the symbol positions at which the gaming device generates symbols. The reels also include sub-symbols 322*a* and 326*a* associated with the symbols as indicated in FIG. 6C by the number icons in the corners associated with the symbols. After the player wagers an amount on one or more of the paylines, the gaming device spins the reels and displays a plurality of the symbols. If any of the generated symbols have associated sub-symbols, those sub-symbols are also displayed. The gaming device determines whether any winning symbol combinations are displayed and determines any awards for any winning symbol combinations. If the predetermined number of complementary sub-symbols are adjacently displayed, the gaming device generates a bonus award. The gaming device provides any awards associated with any determined winning symbol combinations and any bonus awards to the player. In this embodiment, the predetermined number of adjacently displayed complementary sub-symbols is two.

As illustrated in FIG. 6A, the gaming device instructs a player to select a payline and wager an amount on the payline. As illustrated in FIG. 6B, a player selects payline A 300. The gaming device enables the player to wager on payline A 300 and the player wagers ten credits on payline A 300. The gaming device instructs and enables the player to select another payline (if desired) and wager an amount on the selected payline or spin the reels as illustrated in FIG. 6B. It should be appreciated that in one embodiment the gaming device enables the player to wager the same or a different amount on a second payline as the amount wagered on a first payline.

As illustrated in FIG. 6C, in one embodiment, the gaming device spins the reels and displays a plurality of symbols and sub-symbols. The plurality of symbols includes symbols 320, 324, and 328. The plurality of sub-symbols includes sub-symbols 322*a* and 326*a*. The gaming device determines that two complementary sub-symbols 322*a* and 326*a* are adjacently displayed and generates a bonus award. In this embodiment, sub-symbols 322*a* and 326*a* are complementary because they are both icons representing the same number "5." In another embodiment, an additional or increased bonus award may be generated for adjacent sub-symbols that are complementary in more than one way. For example, an additional or increased bonus award is provided for icons representing the same number or same shape that are also the same color.

In one embodiment, the bonus award generated for adjacently displayed complementary sub-symbols 322*a* and 326*a* is an award multiplier for both symbols 320 and 324 associated with the adjacently displayed complementary sub-symbols 322*a* and 326*a*. The award multiplier multiplies any award for any winning symbol combinations containing symbols 320 and 324 by two. The gaming device determines that winning symbol combinations are displayed by the three cherry symbols 320, 324, and 328. Each of the cherry symbols 320, 324, and 328 is associated with an award of five credits. The gaming device multiplies each five-credit award for symbols 320 and 324 by two and adds each resulting ten-credit award to the five-credit award for symbol 328 for a total of twenty-five credits. The display device 120 generates a message indicating that the player has been awarded five credits for the cherry symbol and twenty credits for the two cherry symbols plus the bonus on payline A 300 and displays the award in award indicator 122. In this example, the award multiplier multiplies any award associated with the adjacently displayed complementary sub-symbols by two. However, it should be appreciated that the award multiplier may multiply any award associated with one or more of the adjacently displayed complementary sub-symbols by any suitable number.

In another embodiment, the bonus award associated with symbols 320 and 324 is added to an original award for symbols 320, 324, and 328 to further maximize the award provided. In this embodiment, the bonus award generated by adjacently displayed complementary sub-symbols 322*a* and 326*a* is an award multiplier for both symbols 320 and 324 associated with complementary sub-symbols 322*a* and 326*a*. The award multiplier multiplies any award associated with symbols 320 and 324 by two. The gaming device determines that winning symbol combinations are displayed by the three cherry symbols 320, 324, and 328. Each of the cherry symbols 320, 324, and 328 is associated with an award of five credits. The gaming device determines a total original award of fifteen credits for symbols 320, 324, and 328. The gaming device multiplies each five-credit award associated with symbols 320 and 324 by two, adds them together for a total of twenty credits, and adds this additional twenty credits to the fifteen-credit award previously determined for a total of thirty-five credits. The display device 120 generates a message indicating that the player has been awarded five credits for the cherry symbol and thirty credits for the two cherry symbols plus the bonus on payline A 300 and displays the award in award indicator 122.

It should be appreciated that the bonus award generated by the predetermined number of adjacently displayed complementary sub-symbols may be a free game, a predetermined payout, an award multiplier for one or more of the symbols associated with the complementary sub-symbols, or any other award in addition to that resulting from a winning symbol combination on the reels.

In this embodiment, only cherry symbols, three of any symbol except for cherry or seven symbols, or four or more of a same symbol on a selected payline result in a winning symbol combination and an associated award. However, it should be appreciated that the gaming device may provide any suitable award for any symbol or combination of symbols on the reels.

In another embodiment, the gaming device displays multiple sets of a predetermined number of adjacently displayed complementary sub-symbols and provides bonus awards for each such set of adjacently displayed complementary sub-symbols. In an example of this embodiment, the predetermined number of adjacently displayed complementary sub-symbols is two. It should be appreciated that the predetermined number of adjacently displayed complementary sub-symbols may be any suitable number greater than or equal to two. After a player wagers on one or more paylines, the gaming device spins the reels and displays a plurality of symbols and sub-symbols. The plurality of symbols and sub-symbols includes two groups of two adjacently displayed complementary sub-symbols on the selected payline(s). It should be appreciated, however, that the plurality of symbols and sub-symbols may include more than two groups of adjacently displayed complementary sub-symbols. The gaming device evaluates whether any winning symbol combinations are displayed and determines any awards for any winning symbol combinations. The gaming device generates two bonus awards, one for each group of two adjacently displayed complementary sub-symbols. The gaming device provides the bonus awards and any awards associated with any determined winning symbol combinations to the player.

It should be appreciated that the bonus awards may each be of the same type or of different types. For example, in one embodiment, each bonus award is a free game. In another embodiment, a first bonus award is a free game and a second bonus award is a multiplier for any symbol associated with the adjacently displayed complementary sub-symbols that generated the second bonus award. In another embodiment, a first bonus award is a predetermined payout and a second bonus award is a free game.

It should also be appreciated that the gaming device may determine any awards associated with winning symbol combinations and any bonus awards or any awards resulting from any bonus awards either simultaneously or in any suitable manner. It should further be appreciated that the gaming device may provide any awards associated with winning symbol combinations and any bonus awards or any awards resulting from any bonus awards to the player either simultaneously or in any suitable manner. In one embodiment, the gaming device provides any awards associated with winning symbol combinations first and then provides any bonus awards to the player.

Figure 7A:
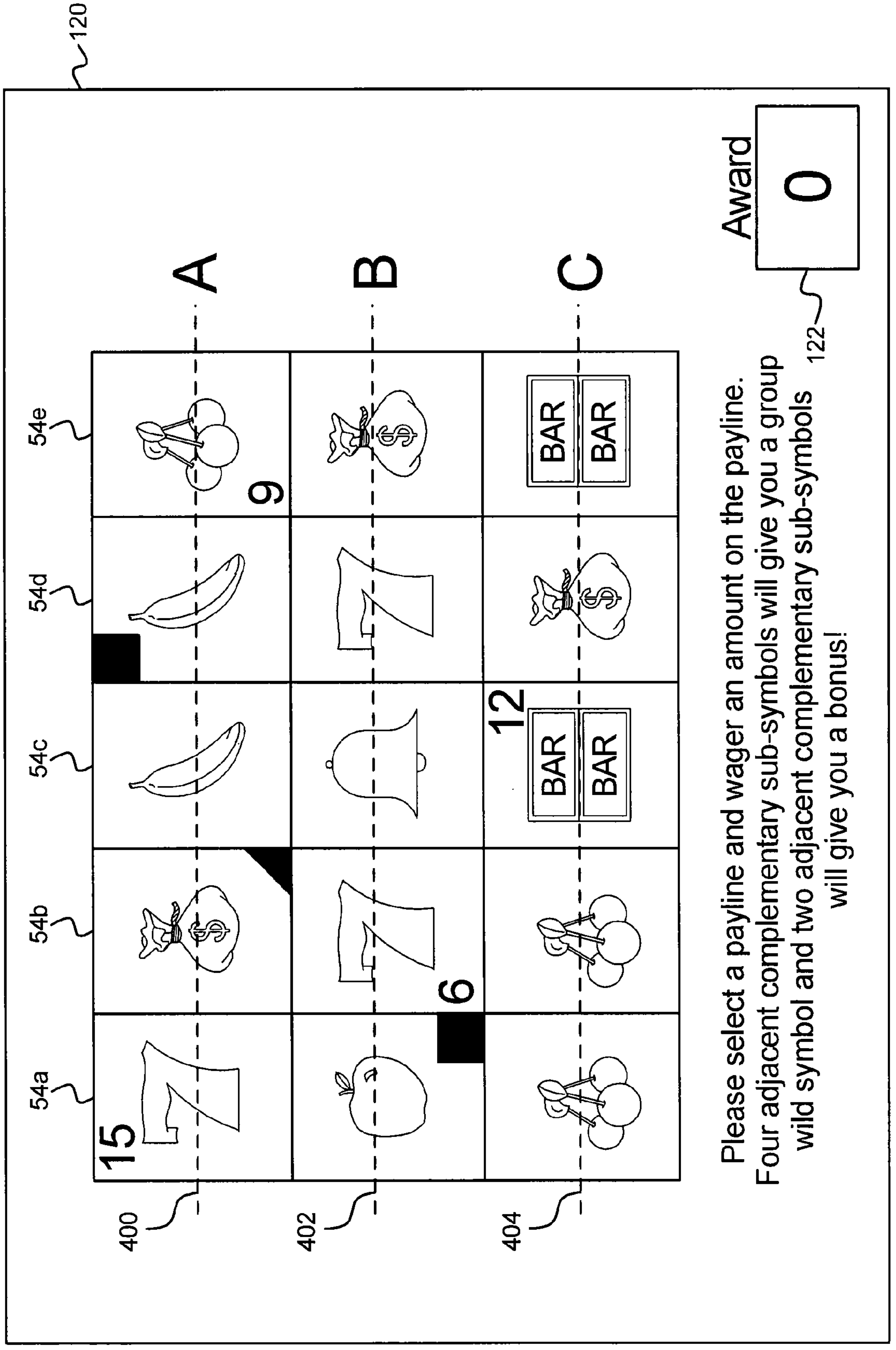
FIGS. 7A, 7B, 7C, and 7D are front elevational views of one embodiment illustrating the gaming device determining whether a first predetermined number of complementary sub-symbols are adjacently displayed, and if so, providing a bonus award to a player, then determining whether a second predetermined number of complementary sub-symbols are adjacently displayed and, if so, forming a group wild symbol.
Figure 7B:
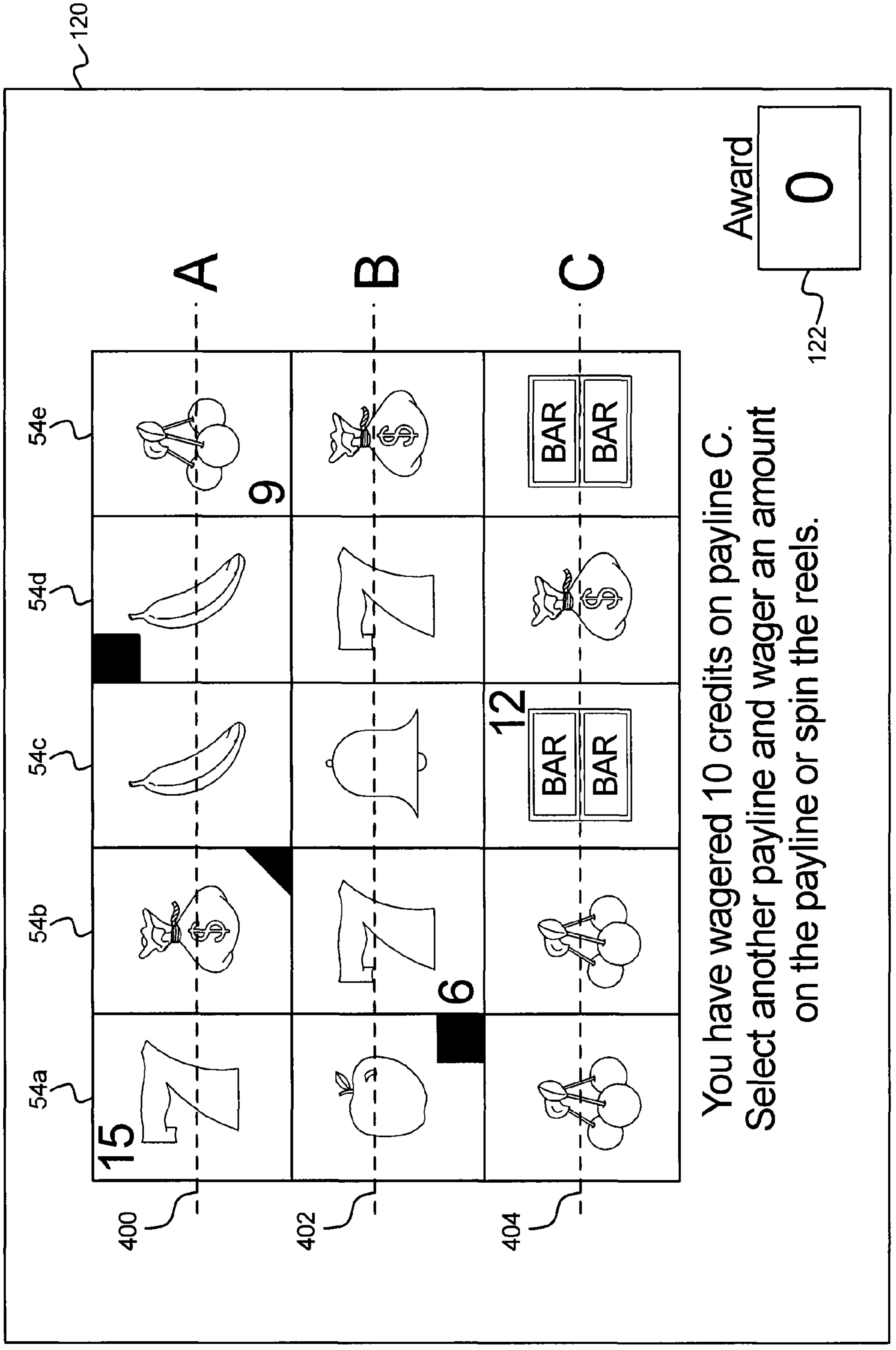
Figure 7C:
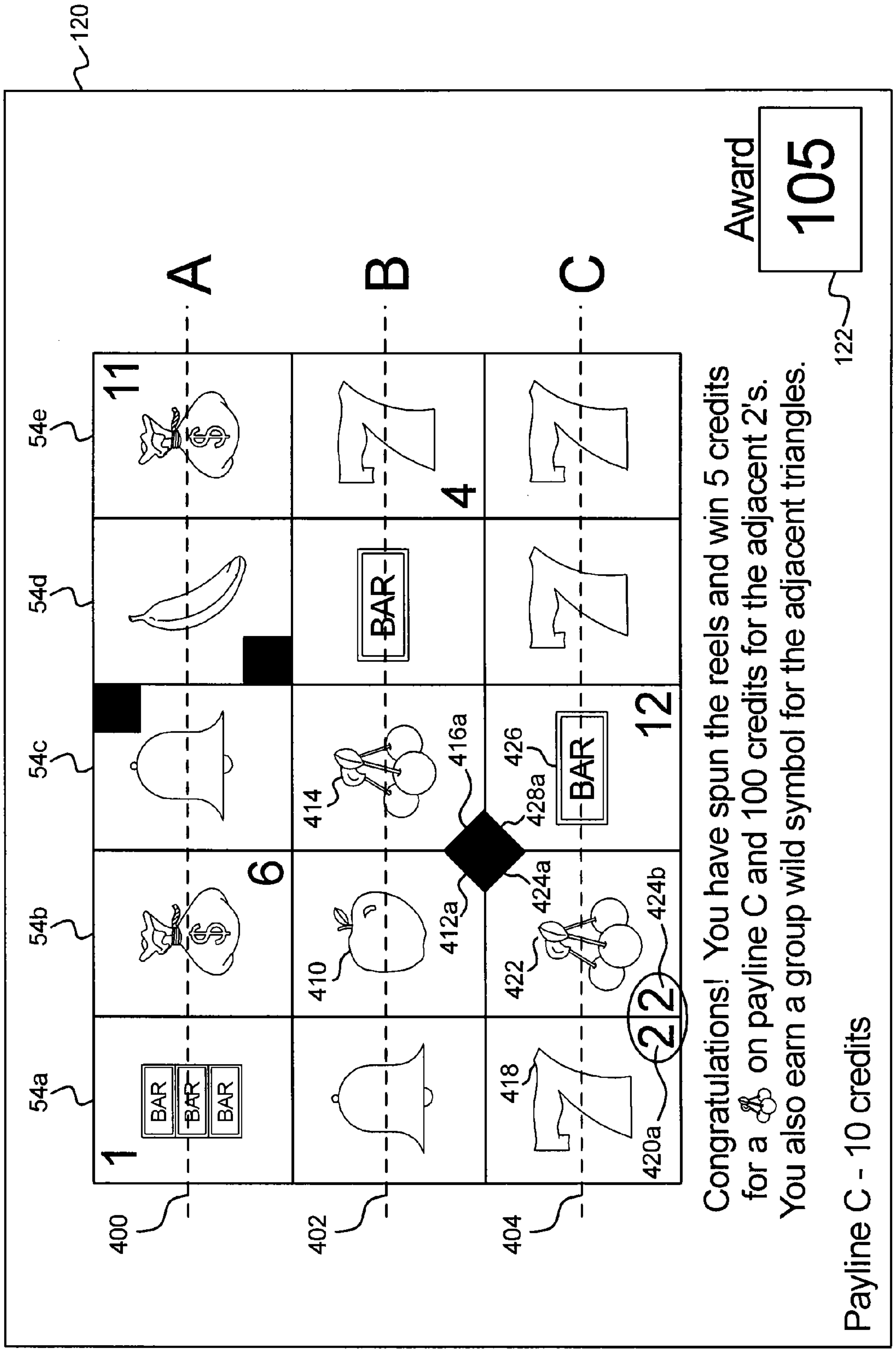
Figure 7D:
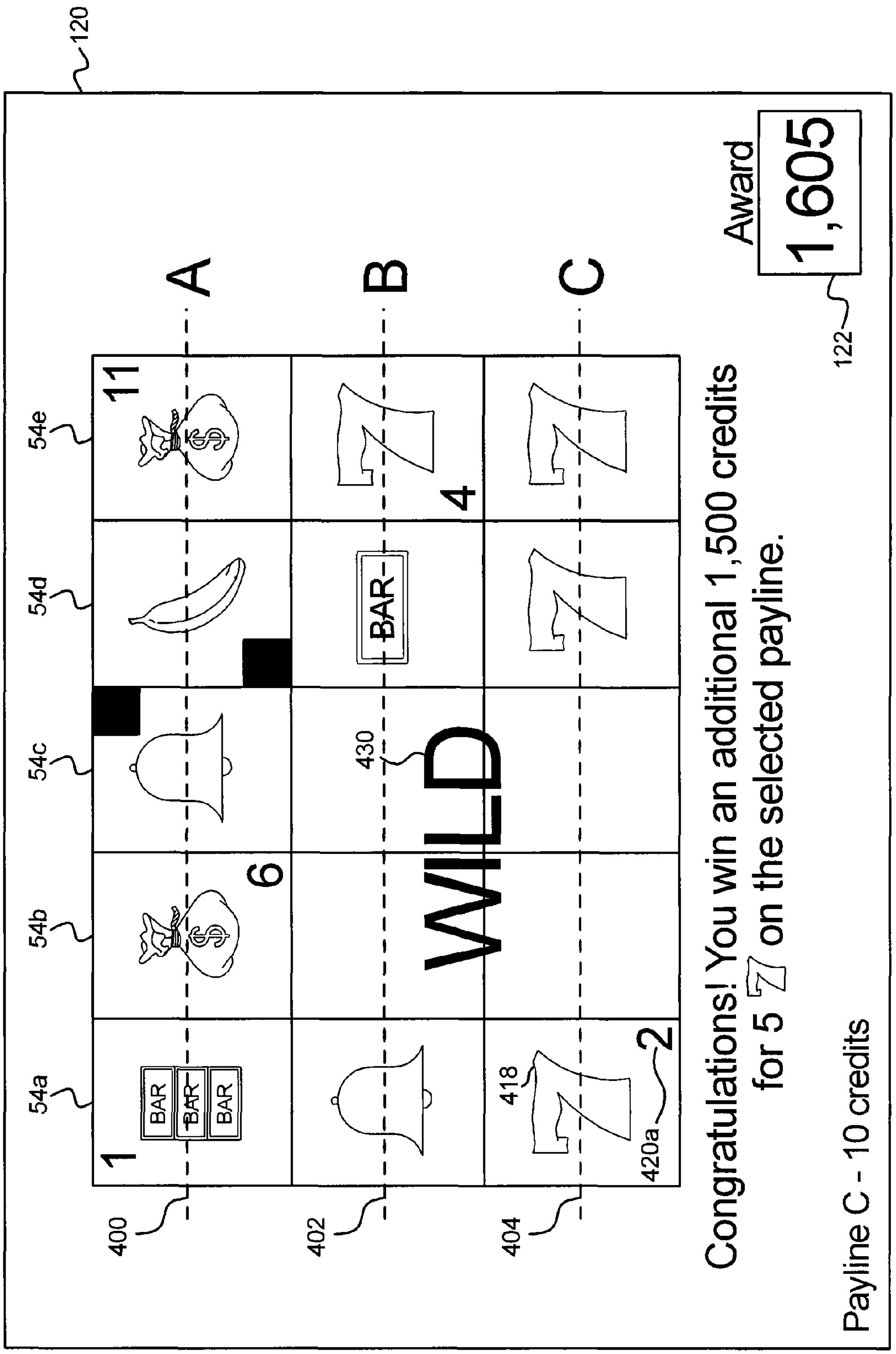

FIGS. 7A, 7B, 7C, and 7D illustrate screen shots of one embodiment where the gaming device provides a bonus award if a first predetermined number of complementary sub-symbols are adjacently displayed and creates a group wild symbol if a second predetermined number of complementary sub-symbols are adjacently displayed. In this embodiment, the gaming device includes a plurality of reels and paylines associated with the reels, where the gaming device enables a player to wager different amounts on a plurality of the paylines. In this illustrated embodiment, a display device 120 displays five video reels 54*a*, 54*b*, 54*c*, 54*d* and 54*e*. The reels include a plurality of symbols 410, 414, 418, 422, and 426. The display device also includes an award indicator or display 122. The display device includes a plurality of paylines which are associated with the symbol positions at which the gaming device generates symbols. The reels also include sub-symbols 412*a*, 416*a*, 420*a*, 424*a*, 424*b*, and 428*a* associated with the symbols as indicated in FIGS. 7C and 7D by the shapes and number icons in the corners associated with the symbols. After the player wagers an amount on one or more of the paylines, the gaming device spins the reels and displays a plurality of the symbols. If any of the generated symbols have associated sub-symbols, those sub-symbols are also displayed. The gaming device determines whether any winning symbol combinations are displayed and determines any awards for any winning symbol combinations. If a first predetermined number of complementary sub-symbols are adjacently displayed, the gaming device generates a bonus award. The gaming device provides the bonus award and any awards for any determined winning symbol combinations to the player. If a second predetermined number of complementary sub-symbols are adjacently displayed, the gaming device transforms the symbols associated with each of the second predetermined number of adjacently displayed complementary sub-symbols into a group wild symbol. The gaming device again evaluates whether any winning symbol combinations are displayed and provides any awards for any winning symbol combinations. In this embodiment, the first predetermined number is two and the second predetermined number is four.

As illustrated in FIG. 7A, the gaming device instructs a player to select a payline and wager an amount on the payline. As illustrated in FIG. 7B, a player selects payline C 404. The gaming device enables the player to wager on payline C 404 and the player wagers ten credits on payline C 404. The gaming device instructs and enables the player to select another payline (if desired) and wager an amount on the selected payline or spin the reels as illustrated in FIG. 7B. It should be appreciated that in one embodiment the gaming device enables the player to wager the same or a different amount on a second payline as the amount wagered on a first payline.

As illustrated in FIG. 7C, in one embodiment, the gaming device spins the reels and displays a plurality of symbols and sub-symbols. The plurality of symbols includes symbols 410, 414, 418, 422, and 426. The plurality of sub-symbols includes sub-symbols 412*a*, 416*a*, 420*a*, 424*a*, 424*b*, and 428*a*. The gaming device determines that the first predetermined number of complementary sub-symbols are adjacently displayed by the two adjacent complementary sub-symbols 420*a* and 424*b* and generates a bonus award of one hundred credits. In this embodiment, sub-symbols 420*a* and 424*b* are complementary because they are both icons representing the same number "2." In another embodiment, an additional or increased bonus award may be generated for adjacent sub-symbols that are complementary in more than one way. For example, an additional or increased bonus award is provided for icons representing the same number or same shape that are also the same color. The gaming device determines that a winning combination is displayed by cherry symbol 422. Cherry symbol 422 is associated with an award of five credits. The gaming device adds the one hundred-credit bonus award to the five-credit award for symbol 422 for a total of one hundred and five credits.

The gaming device determines that the second predetermined number of complementary sub-symbols are adjacently displayed by the four adjacently displayed complementary sub-symbols 412*a*, 416*a*, 424*a*, and 428*a*. In this embodiment, sub-symbols 412*a*, 416*a*, 424*a*, and 428*a* are complementary because they are all triangles that form quadrants of the same shape, a diamond. The display device 120 generates a message indicating that the player has been awarded five credits for the cherry symbol 422 on payline A 300, one hundred credits as a bonus award for the adjacent "2" icons, and a group wild symbol for the adjacent triangles. The display device 120 displays the total award of one hundred and five credits in award indicator 122.

It should be appreciated that the gaming device may determine any awards associated with any winning symbol combinations and any bonus awards or any awards resulting from any bonus awards either simultaneously or in any suitable manner. It should also be appreciated that the gaming device may provide any awards associated with any determined winning symbol combinations and any bonus awards or any awards resulting from any bonus awards either simultaneously or in any suitable manner. In one embodiment, the gaming device provides any awards associated with determined winning symbol combinations first and then provides any bonus awards to the player.

As illustrated in FIG. 7D, in one embodiment, the gaming device transforms the symbols 410, 414, 422, and 426 associated with the adjacently displayed complementary sub-symbols 412*a*, 416*a*, 424*a*, and 428*a* into a group wild symbol 430. The group wild symbol 430 functions as a wild symbol which substitutes for any symbol or a designated group of symbols used in the game to maximize the award. In this embodiment, the group wild symbol 430 functions as individual wild symbols for each of the symbols 410, 414, 422, and 426 associated with the adjacently displayed complementary sub-symbols 412*a*, 416*a*, 424*a*, and 428*a*. The group wild symbol 430 accordingly may substitute for as many as four different symbols in the same reel positions as symbols 410, 414, 422, and 426. However, it should be appreciated that the group wild symbol 430 in another embodiment may substitute for only one symbol in each of the reel positions associated with symbols 410, 414, 422, and 426. The selected payline C 404 includes three seven symbols, and thus the group wild symbol 430 substitutes for two seven symbols on payline C 404 to create a winning symbol combination of five seven symbols. The gaming device determines that a winning symbol combination of five seven symbols is displayed on payline C 404 and provides the player an additional award of one thousand five hundred credits. The display device 120 generates a message indicating that the player has been awarded an additional one thousand five hundred credits and displays the total award of one thousand six hundred and five credits in award indicator 122.

In this embodiment, the award associated with five seven symbols on a selected payline is one thousand five hundred credits and the award associated with a cherry symbol on a selected payline is five credits. In this embodiment, only cherry symbols, three of any symbol except for cherry or seven symbols, or four or more of a same symbol on a selected payline result in a winning combination and an associated award. However, it should be appreciated that the gaming device may provide any suitable award for any symbol or combination of symbols on the reels.

Figure 8A:
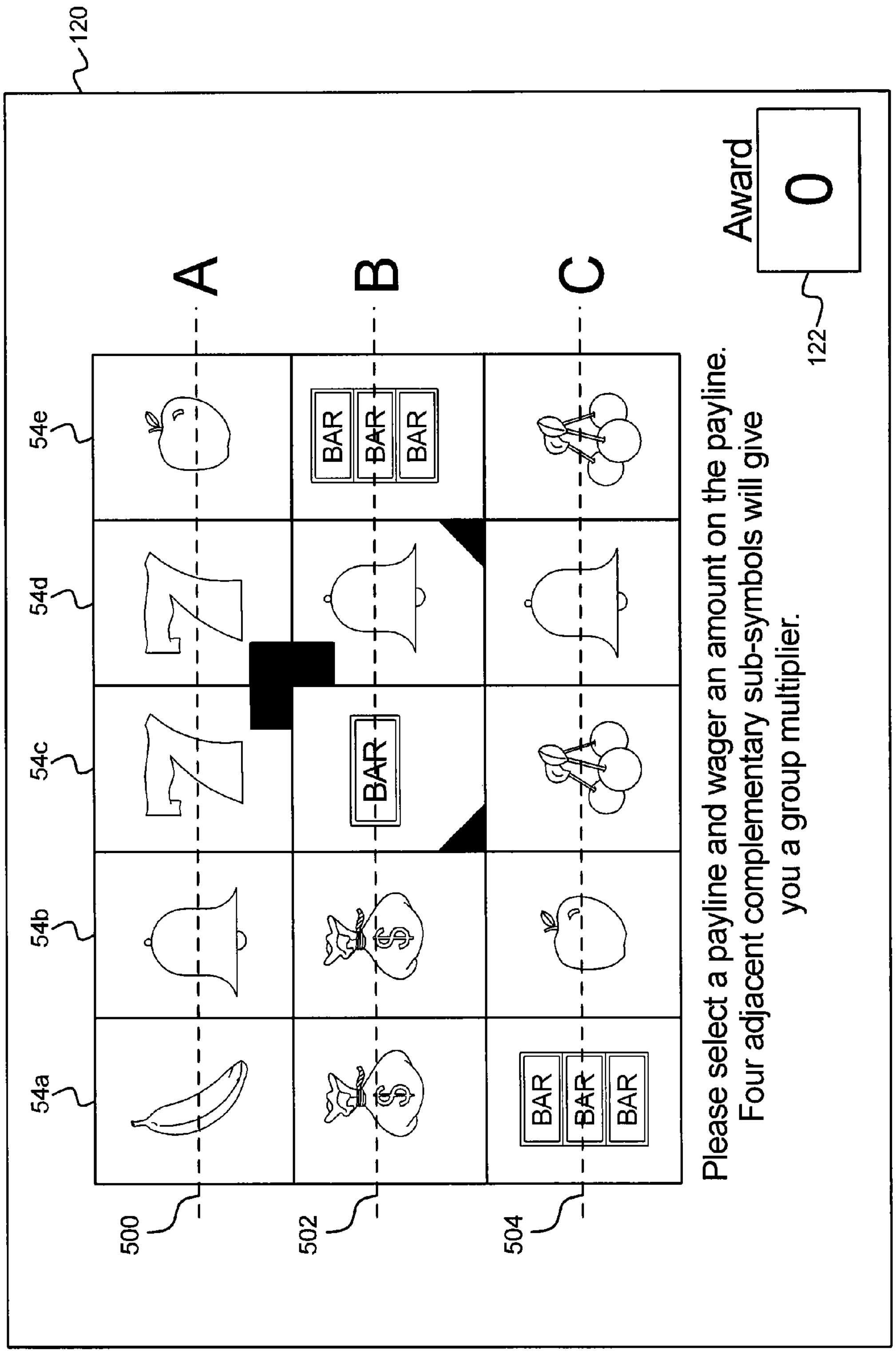
FIGS. 8A, 8B, 8C, and 8D are front elevational views of one embodiment illustrating the gaming device determining whether a predetermined number of complementary sub-symbols are adjacently displayed, and if so, forming a group multiplier to provide the player with a maximum award.
Figure 8B:
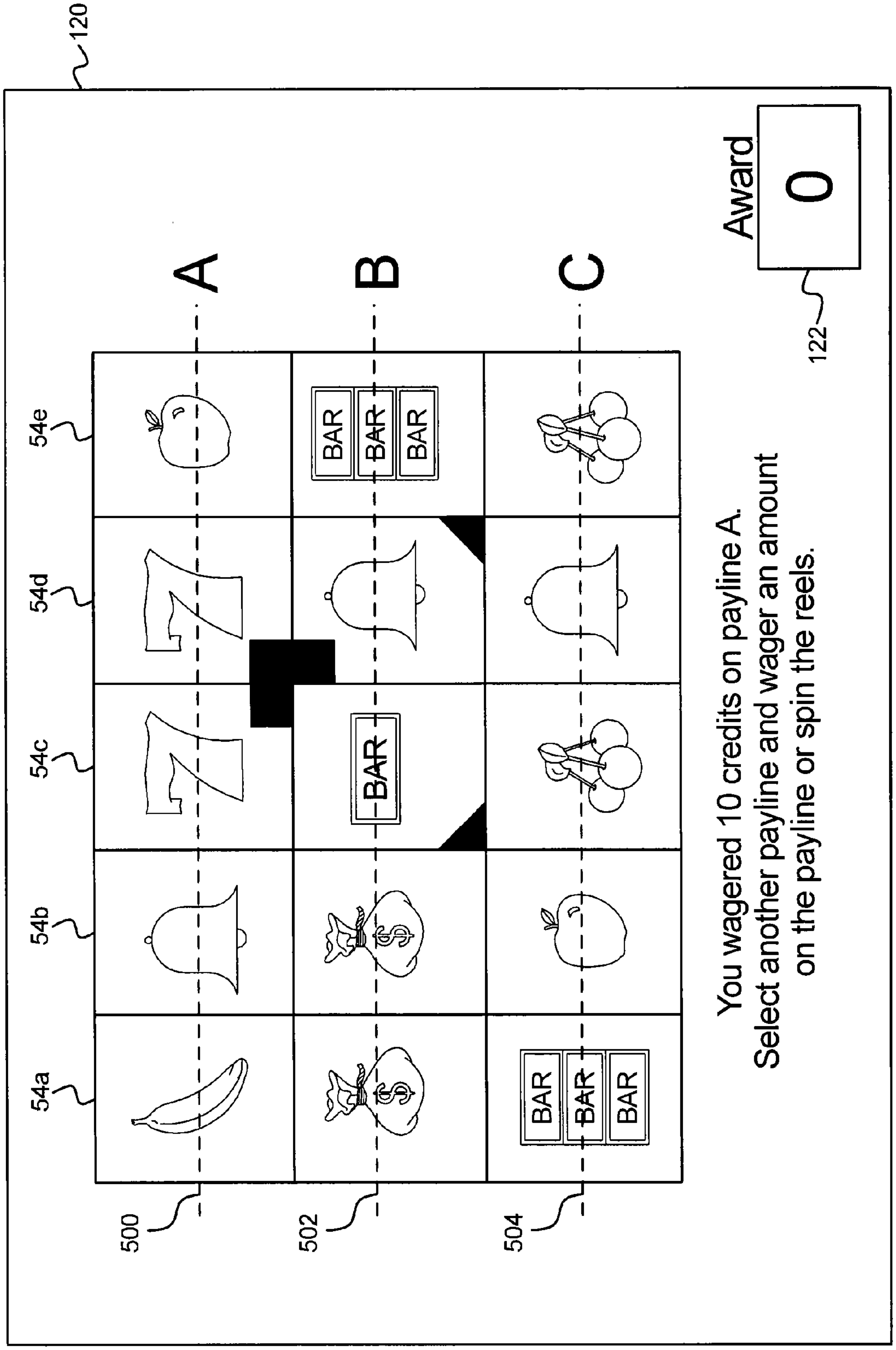
Figure 8C:
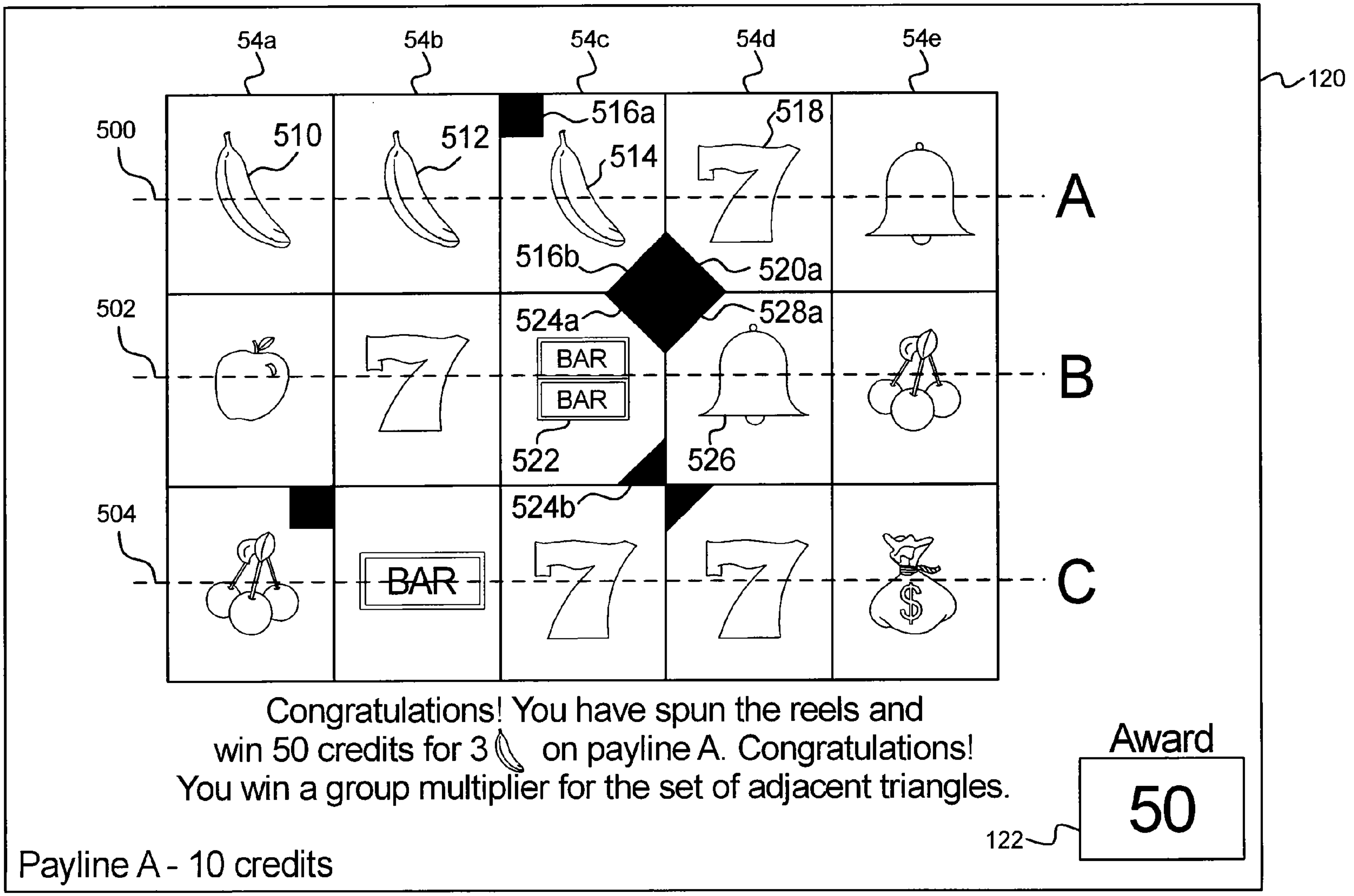
Figure 8D:
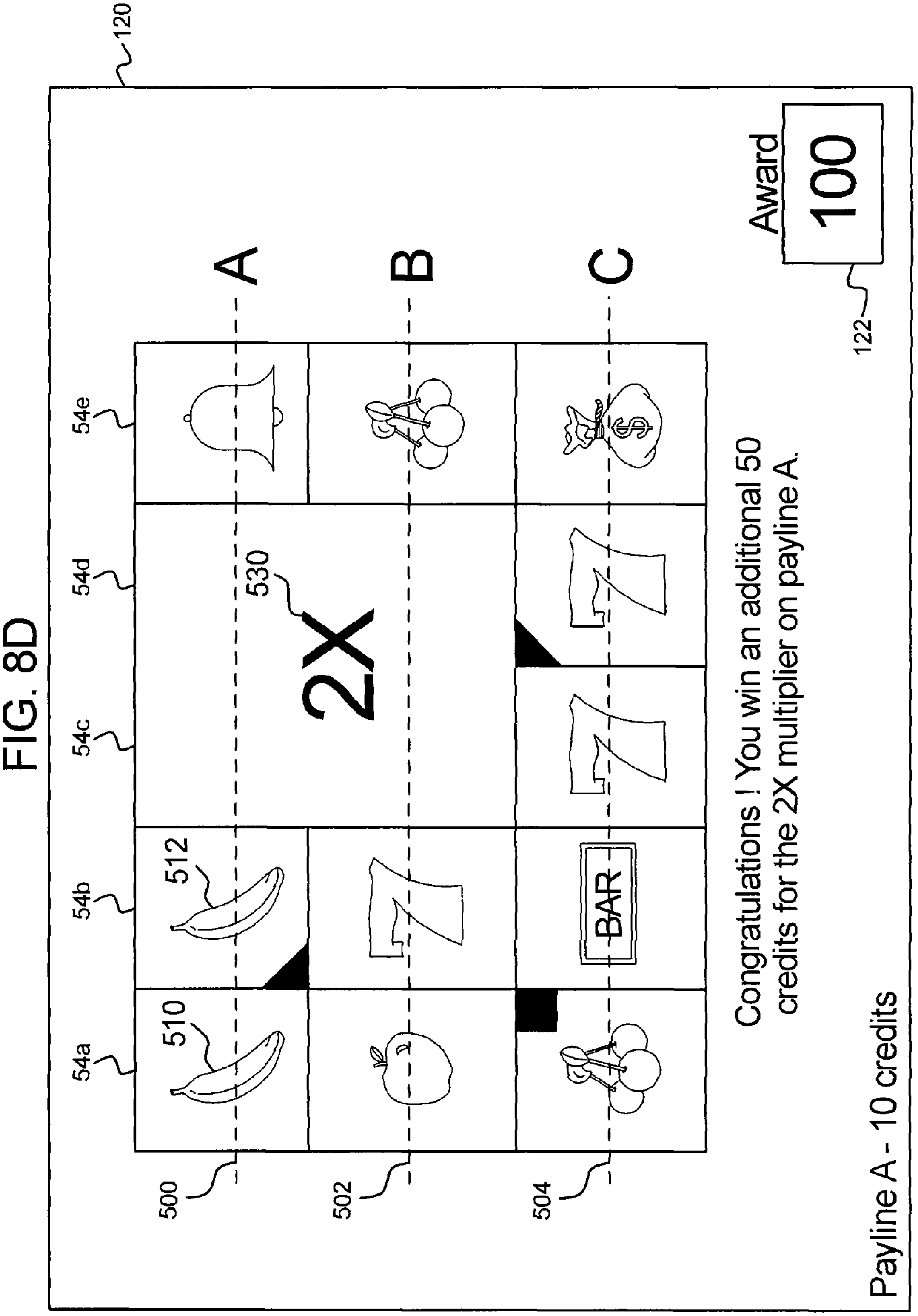

FIGS. 8A, 8B, 8C, and 8D illustrate screen shots of one embodiment where the gaming device transforms the symbols associated with each of a predetermined number of adjacently displayed complementary sub-symbols into a group multiplier. In this embodiment, the gaming device includes a plurality of reels and paylines associated with the reels, where the gaming device enables a player to wager different amounts on a plurality of the paylines. In this illustrated embodiment, a display device 120 displays five video reels 54*a*, 54*b*, 54*c*, 54*d* and 54*e*. The reels include a plurality of symbols 510, 512, 514, 518, 522, and 526. The display device also includes an award indicator or display 122. The display device includes a plurality of paylines which are associated with the symbol positions at which the gaming device generates symbols. The reels also include sub-symbols 516*a*, 516*b*, 520*a*, 524*a*, 524*b*, and 528*a* associated with the symbols as indicated in FIGS. 8C and 8D by the number icons in the corners associated with the symbols. After the player wagers an amount on one or more of the paylines, the gaming device spins the reels and displays a plurality of the symbols. If any of the generated symbols have associated sub-symbols, those sub-symbols are also displayed. In one embodiment, the gaming device determines whether any winning symbol combinations are displayed and provides any associated awards. If the predetermined number of complementary sub-symbols are adjacently displayed, the gaming device transforms the symbols associated with each of the predetermined number of adjacently displayed complementary sub-symbols into a group multiplier. The gaming device multiplies any awards for any winning symbol combinations containing symbols associated with one of the predetermined group of adjacently displayed complementary sub-symbols by a suitable number and provides a total award to the player. In this embodiment, the predetermined number of adjacently displayed complementary sub-symbols is four.

As illustrated in FIG. 8A, the gaming device instructs a player to select a payline and wager an amount on the payline. As illustrated in FIG. 8B, a player selects payline A 500. The gaming device enables the player to wager on payline A 500 and the player wagers ten credits on payline A 500. The gaming device instructs and enables the player to select another payline (if desired) and wager an amount on the selected payline or spin the reels as illustrated in FIG. 8B. It should be appreciated that in one embodiment the gaming device enables the player to wager the same or a different amount on a second payline as the amount wagered on a first payline.

As illustrated in FIG. 8C, in one embodiment, the gaming device spins the reels and displays a plurality of symbols and sub-symbols. The plurality of symbols includes symbols 510, 512, 514, 518, 522, and 526. The plurality of sub-symbols includes sub-symbols 516*a*, 516*b*, 520*a*, 524*a*, 524*b*, and 528*a*. The gaming device determines that a winning symbol combination of three banana symbols is displayed on payline A 500 and awards the player fifty credits for the three banana symbols 510, 512, and 514. The gaming device determines that the predetermined number of adjacently displayed complementary sub-symbols are displayed by the four adjacently displayed complementary sub-symbols 516*b*, 520*a*, 524*a*, and 528*a*. In this embodiment, sub-symbols 516*b*, 520*a*, 524*a*, and 528*a* are complementary because they are all triangles that form quadrants of the same shape, a diamond. The display device 120 generates a message indicating that the player has been awarded fifty credits and a group multiplier for the adjacent triangles and displays the award in award indicator 122.

As illustrated in FIG. 8D, in one embodiment, the gaming device transforms the symbols 514, 518, 522, and 526 associated with the adjacently displayed complementary sub-symbols 516*b*, 520*a*, 524*a*, and 528*a* into a group multiplier 530. The group multiplier 530 functions as a multiplier which increases the award provided for any winning symbol combinations containing a symbol associated with one of the predetermined number of adjacently displayed complementary sub-symbols. In this embodiment, the gaming device multiplies the award provided for any winning symbol combinations containing symbols 514, 518, 522, or 526 by two, because symbols 514, 518, 522, and 526 are associated with adjacently displayed complementary sub-symbols 516*b*, 520*a*, 524*a*, and 528*a*, respectively. The selected payline A 500 includes a winning symbol combination of three banana symbols 510, 512, and 514, and thus the gaming device multiplies the associated award of fifty credits for three banana symbols by two for a new award total of one hundred credits. The display device 120 generates a message indicating that the player has been awarded an additional fifty credits for the group multiplier and displays the total award of one hundred credits in award indicator 122. In this embodiment, the award associated with three banana symbols on a selected payline is fifty credits. However, it should be appreciated that the gaming device may provide any suitable award for any symbol or combination of symbols on the reels.

In an alternative embodiment, the group multiplier increases the award provided for any winning symbol combinations on active paylines containing a symbol associated with one of a predetermined number of adjacently displayed complementary sub-symbols. In such an embodiment, the winning symbol combination itself does not need to contain a symbol associated with one of the predetermined number of adjacently displayed complementary sub-symbols in order to be increased by the group multiplier, as long as the winning symbol combination is located on an active payline that contains such symbol. In this embodiment, after the player wagers an amount on one or more of the paylines, the gaming device spins the reels and displays a plurality of the symbols. If any of the generated symbols have associated sub-symbols, those sub-symbols are also displayed. The gaming device determines whether any winning symbol combinations are displayed and provides any associated awards. If the predetermined number of complementary sub-symbols are adjacently displayed, the gaming device transforms the symbols associated with each of the predetermined number of adjacently displayed complementary sub-symbols into a group multiplier. The gaming device multiplies any awards for any winning symbol combinations on active paylines containing symbols associated with one of the predetermined group of adjacently displayed complementary sub-symbols by a suitable number and provides a total award to the player.

It should be appreciated that while the method of generating a predetermined number of adjacently displayed complementary sub-symbols and producing a desired outcome such as forming a group wild symbol, generating a bonus award, or forming a group multiplier is described in regard to a slot game, the present disclosure can be implemented into any suitable type of game wherein a plurality of symbols and sub-symbols are generated, at least two complementary sub-symbols may be adjacent to each other, and any award, if any, is provided to a player based on generated symbols or symbol combinations.

It should also be appreciated that the games disclosed herein may include one or more moving symbols, falling symbols, rotating symbols, rising symbols, stacked symbols, cascading symbols or any other suitable type of symbols.

In another embodiment, the gaming device transforms the symbols associated with each of a predetermined number of adjacently displayed complementary sub-symbols into a single group wild symbol in a deck of cards. In this embodiment, the gaming device includes a plurality of cards having a plurality of symbols. The gaming device enables a player to wager a bet on the cards. The gaming device generates a plurality of symbols on the cards. If any of the generated symbols have associated sub-symbols, such sub-symbols are also displayed. If a winning symbol combination is displayed on the cards, the gaming device provides an award to the player. In one embodiment, after any awards for any winning symbol combinations are provided to the player, the gaming device determines if the plurality of symbols includes the predetermined number of adjacently displayed complementary sub-symbols on the cards. If the predetermined number of complementary sub-symbols are adjacently displayed, the gaming device transforms the symbols associated with each of the predetermined number of adjacently displayed complementary sub-symbols into a single group wild symbol. This group wild symbol functions as individual wild symbols for each of the symbols associated with the predetermined number of adjacently displayed complementary sub-symbols. This group wild symbol can then substitute for any other symbols or a designated group of symbols used by the gaming device. The gaming device again evaluates whether any winning symbol combinations are displayed on the cards and provides any awards for any determined winning symbol combinations to the player.

In one example of this embodiment, the predetermined number of complementary sub-symbols is four and the complementary sub-symbols are in the form of quadrants of a square. A player wagers on the cards. The gaming device generates a plurality of symbols. If any of the generated symbols have associated sub-symbols, those sub-symbols are also displayed. The gaming device evaluates whether any winning symbol combinations are displayed and provides any awards to the player. The gaming device determines whether any sub-symbols form the four adjacent corners of a square. If so, the gaming device transforms the symbols associated with the four adjacently displayed complementary sub-symbols into a group wild symbol. The gaming device evaluates whether any winning symbol combinations are displayed and provides any awards to the player.

In this example, when a first symbol on a first column and a first row of cards displays a complementary sub-symbol in its lower right corner in the form of an upper left quadrant of a square, a second symbol beneath the first symbol on a second row of cards displays a complementary sub-symbol in its upper right corner in the form of a lower left quadrant of a square, a third symbol adjacent to the first symbol on a second column of cards displays a complementary sub-symbol in its lower left corner in the form of an upper right quadrant of a square, and a fourth symbol adjacent to the second symbol displays a complementary sub-symbol in its upper left corner in the form of a lower right quadrant of a square, the processor of the gaming device transforms the first, second, third, and fourth symbols into a group wild symbol. In this example of the embodiment, the four adjacently displayed complementary sub-symbols form a complete square.

It should be appreciated that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

(A) display a game including:

(a) a plurality of adjacently arranged video reels, (b) a plurality of symbol display positions associated with the video reels, (c) a plurality of symbols on the video reels, and (d) a plurality of sub-symbols on the video reels, wherein each sub-symbol is associated with one of the plurality of symbols and has a designated number of complementary sub-symbols, said designated number being at least one, and (B) for each play of the game:

(a) generate and display on the video reels a plurality of the symbols and any sub-symbols associated with said generated and displayed symbols, wherein each generated and displayed symbol and any sub-symbols associated with said generated and displayed symbol are displayed at one of the symbol display positions;

(b) determine whether a plurality of sets of complementary sub-symbols are displayed, each set of complementary sub-symbols including a predetermined quantity of adjacently displayed complementary sub-symbols, said predetermined quantity being at least two;

(c) if a plurality of sets of complementary sub-symbols are displayed, for each displayed set of complementary sub-symbols:

(i) transform said generated and displayed symbols associated with said adjacently displayed complementary sub-symbols of said displayed set of complementary sub-symbols into a distinct group wild symbol such that at least two of said generated and displayed symbols associated with said adjacently displayed complementary sub-symbols of said displayed set of complementary sub-symbols are transformed, and (ii) display said group wild symbol, wherein at least one of the symbol display positions can be overlapped by at least two displayed group wild symbols;

(d) if any of the symbol display positions are overlapped by at least two displayed group wild symbols, for each of said overlapped symbol display positions:

(i) display an indication that said symbol display position is overlapped by at least two displayed group wild symbols, and (ii) associated said overlapped symbol display position with one of a plurality of award modifiers, each of the award modifiers being configured to modify any awards associated with any winning symbol combinations associated with said overlapped symbol display position;

(e) evaluate whether any winning symbol combinations are displayed and, if any winning symbol combinations are displayed, for each displayed winning symbol combination:

(i) determine any awards associated with said displayed winning symbol combination; and (ii) if two or more displayed group wild symbols overlap on at least one symbol display position associated with said displayed winning symbol combination, modify said determined awards associated with said displayed winning symbol combination with the award modifier associated with said overlapped symbol display position; and (f) provide said determined awards.

2. The gaming device of claim 1, wherein before determining whether a plurality of sets of complementary sub-symbols are displayed, the plurality of instructions, when executed by the at least one processor, cause the at least one processor to: (a) evaluate whether any winning combinations of the symbols are displayed; and (b) provide any awards for any winning symbol combinations.

3. The gaming device of claim 1, wherein if a plurality of group wild symbols are displayed, the plurality of instructions, when executed by the at least one processor, cause the at least one processor to provide a consolation award if no winning symbol combinations result from the plurality of displayed group wild symbols.

4. The gaming device of claim 3, wherein the consolation award is chosen from the group consisting of: a payout, a free game, an award multiplier for some or all of the symbols associated with said complementary sub-symbols, and any other award provided to the player if no winning symbol combinations result from the plurality of displayed group wild symbols.

5. The gaming device of claim 1, wherein the complementary sub-symbols are chosen from the group consisting of: components of a same shape, shapes having the same color, matching numbers, and matching shapes.

6. The gaming device of claim 1, wherein the group wild symbol is displayed as a single wild symbol.

7. The gaming device of claim 1, wherein the group wild symbol is displayed as a plurality of wild symbols.

8. The gaming device of claim 1, which, includes a plurality of groups of complementary sub-symbols, wherein the plurality of instructions, when executed by the at least one processor, cause the at least one processor to, for each group of complementary sub-symbols, if a plurality of sets of complementary sub-symbols of said group are displayed, transform the generated and displayed symbols associated with said adjacently displayed complementary sub-symbols of said displayed set of complementary sub-symbols into a distinct group wild symbol such that at least two symbols associated with said adjacently displayed complementary sub-symbols of said displayed set of complementary sub-symbols are transformed.

9. The gaming device of claim 8, which includes a probability of each group wild symbol forming on the reels, wherein the probability of one of the group wild symbols forming on the reels is greater than the probability of another one of the group wild symbols forming on the reels.

10. The gaming device of claim 1, which includes at least two different groups of complementary sub-symbols, wherein at least one of said groups consists of sub-symbols that are complementary in a different manner than the sub-symbols of another one of said groups.

11. The gaming device of claim 1, wherein each symbol is associated with at least one sub-symbol.

12. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

(A) display a game including:

(a) a plurality of adjacently arranged video reels, (b) a plurality of symbol display positions associated with the video reels, (c) a plurality of symbols on the video reels, and (d) a plurality of sub-symbols on the video reels, wherein each sub-symbol is associated with one of the plurality of symbols and has a designated number of complementary sub-symbols, said designated number being at least one, and (B) for each play of the game:

(a) generate and display on the video reels a plurality of the symbols and any sub-symbols associated with said generated and displayed symbols, wherein each generated and displayed symbol and any sub-symbols associated with said generated and displayed symbol are displayed at one of the symbol display positions;

(b) for each of a plurality of groups of complementary sub-symbols, determine whether at least one set of complementary sub-symbols is displayed, each set of complementary sub-symbols including a predetermined quantity of adjacently displayed complementary sub-symbols of said group, said predetermined quantity being at least two;

(c) if a plurality of sets of complementary sub-symbols are displayed, for each displayed set of complementary sub-symbols:

(i) transform said generated and displayed symbols associated with said adjacently displayed complementary sub-symbols of said displayed set of complementary sub-symbols into a distinct group wild symbol such that at least two symbols associated with said adjacently displayed complementary sub-symbols of said displayed set of complementary sub-symbols are transformed, and (ii) display said group wild symbol, wherein at least one of the symbol display positions can be overlapped by at least two displayed group wild symbols;

(d) if any of the symbol display positions are overlapped by at least two displayed group wild symbols, for each of said overlapped symbol display positions:

(i) display an indication that said symbol display position is overlapped by at least two displayed group wild symbols, and (ii) associated said overlapped symbol display position with one of a plurality of award modifiers, each of the award modifiers being configured to modify any awards associated with any winning symbol combinations associated with said overlapped symbol display position;

(e) evaluate whether any winning symbol combinations are displayed and, if any winning symbol combinations are displayed, for each displayed winning symbol combination:

(i) determine any awards associated with said displayed winning symbol combination; and (ii) if two or more displayed group wild symbols overlap on at least one symbol display position associated with said displayed winning symbol combination, modify said determined awards associated with said displayed winning symbol combination with the award modifier associated with said overlapped symbol display position; and (f) provide said determined awards.

13. The gaming device of claim 12, wherein before determining whether, a plurality of sets of complementary sub-symbols displayed, the plurality of instructions, when executed by the at least one processor, cause the at least one processor to: (a) evaluate whether any winning combinations of the symbols are displayed; and (b) provide any awards for any winning symbol combinations.

14. The gaming device of claim 12, wherein if a plurality of group wild symbols are displayed, the plurality of instructions, when executed by the at least one processor, cause the at least one processor to provide a consolation award if no winning symbol combinations result from the plurality of displayed group wild symbols.

15. The gaming device of claim 14, wherein the consolation award is chosen from the group consisting of: a payout, a free game, an award multiplier for some or all of the symbols associated with said complementary sub-symbols, and any other award provided to the player if no winning symbol combinations result from the plurality of displayed group wild symbols.

16. The gaming device of claim 14, wherein the complementary sub-symbols are chosen from the group consisting of: components of a same shape, shapes having the same color, matching numbers, and matching shapes.

17. The gaming device of claim 12, wherein the group wild symbol is displayed as a single wild symbol.

18. The gaming device of claim 12, wherein the group wild symbol is displayed as a plurality of wild symbols.

19. The gaming device of claim 12, which includes a probability of each group wild symbol forming on the reels, wherein the probability of one of the group wild symbols forming on the reels is greater than the probability of another one of the group wild symbols forming on the reels.

20. The gaming device of claim 12, wherein at least two of the groups of complementary sub-symbols are different, wherein at least one of said groups consists of sub-symbols that are complementary in a different manner than the sub-symbols of another one of said groups.

21. A method of operating a gaming device, said method comprising:

(a) causing a processor to operate with a display device to display a plurality of adjacently arranged video reels, the video reels being associated with a plurality of symbol display positions, the video reels including a plurality of symbols and a plurality of sub-symbols, wherein each sub-symbol is associated with one of the plurality of symbols and has a designated number of complementary sub-symbols, said designated number being at least one;

(b) causing the processor to activate the video reels;

(c) causing the processor to operate with the display device to generate and display a plurality of the symbols and a plurality of the sub-symbols on the video reels, wherein each generated and displayed symbol and any sub-symbols associated with said generated and displayed symbol are displayed at one of the symbol display positions;

(d) causing the processor to determine whether a plurality of sets of complementary sub-symbols are displayed, each set of complementary sub-symbols including a predetermined quantity of adjacently-displayed complementary sub-symbols, said predetermined quantity being at least two;

(e) if a plurality of sets of complementary sub-symbols are displayed, for each displayed set of complementary sub-symbols:

(i) causing the processor to transform said generated and displayed symbols associated with said adjacently displayed complementary sub-symbols of said displayed set of complementary sub-symbols into a distinct group wild symbol such that at least two symbols associated with said adjacently displayed complementary sub-symbols of said displayed set of complementary sub-symbols are transformed, and (ii) causing the processor to operate with the display device to display said group wild symbol, wherein at least one of the symbol display positions can be overlapped by at least two displayed group wild symbols;

(f) if any of the symbol display positions are overlapped by at least two displayed group wild symbols, for each of said overlapped symbol display positions:

(i) causing the processor to operate with the display device to display an indication that said symbol display position is overlapped by at least two displayed group wild symbols, and (ii) causing the processor to associate said overlapped symbol display position with one of a plurality of award modifiers, each of the award modifiers being configured to modify any awards associated with any winning symbol combinations associated with said overlapped symbol display position, (g) causing the processor to evaluate whether any winning symbol combinations are displayed;

(h) if any winning symbol combinations are displayed, for each displayed winning symbol combination:

(i) causing the processor to determine any awards associated with said displayed winning symbol combination; and (ii) if two or more displayed group wild symbols overlap on at least one symbol display position associated with said displayed winning symbol combination, causing the processor to modify said determined awards associated with said displayed winning symbol combination with the award modifier associated with said overlapped symbol display position; and (i) providing said determined awards.

22. The method of claim 21, which includes causing the processor to evaluate whether any winning symbol combinations are displayed and provide any awards for any winning symbol combinations after the processor determines whether a plurality of sets of complementary sub-symbols are displayed and before the processor transforms any symbols into the group wild symbol.

23. The method of claim 21, which includes, if a plurality of group wild symbols are displayed, providing a consolation award if no winning symbol combinations result from the plurality of displayed group wild symbols.

24. The method of claim 23, wherein said consolation award is chosen from the group consisting of: a payout, a free game, an award multiplier for some or all of the symbols associated with said complementary sub-symbols, and any other award provided to the player if no winning symbol combinations result from the plurality of displayed group wild symbols.

25. The method of claim 21, which includes a plurality of groups of complementary sub-symbols and when a plurality of sets of complementary sub-symbols of any of the groups of complementary sub-symbols are displayed, for each of said groups of complementary sub-symbols, causing the processor to transform the generated and displayed symbols associated with said adjacently displayed complementary sub-symbols of said displayed set of complementary sub-symbols into a distinct group wild symbol such that at least two symbols associated with said adjacently displayed complementary sub-symbols are transformed.

26. The method of claim 21, wherein each symbol is associated with at least one sub-symbol.

27. The method of claim 21, wherein the method is provided through a data network.

28. The method of claim 27, wherein the data network is an internet.

29. A method of operating a gaming device, said method comprising:

(a) causing a processor to operate with a display device to display a plurality of adjacently arranged video reels, the video reels being associated with a plurality of symbol display positions, the video reels including a plurality of symbols and a plurality of sub-symbols, wherein each sub-symbol is associated with one of the plurality of symbols and has a designated number of complementary sub-symbols, said designated number being at least one;

(b) causing the processor to activate the video reels;

(c) causing the processor to operate with the display device to generate and display a plurality of the symbols and a plurality of the sub-symbols on the video reels, wherein each generated and displayed symbol and any sub-symbols associated with said generated and displayed symbol are displayed at one of the symbol display positions;

(d) for each of a plurality of groups of complementary sub-symbols, causing the processor to determine whether at least one set of complementary sub-symbols are displayed, each set of complementary sub-symbols including a predetermined quantity of adjacently-displayed complementary sub-symbols, said predetermined quantity being at least two;

(e) if a plurality of sets of complementary sub-symbols are displayed, for each displayed set of complementary sub-symbols:

(i) causing the processor to transform said generated and displayed symbols associated with said adjacently displayed complementary sub-symbols of said set of complementary wild symbols into a distinct group wild symbol such that at least two symbols associated with said adjacently displayed complementary sub-symbols are transformed, and (ii) causing the processor to operate with the display device to display said group wild symbol, wherein at least one of the symbol display positions can be overlapped by at least two displayed group wild symbols;

(f) if any of the symbol display positions are overlapped by at least two displayed group wild symbols, for each of said overlapped symbol display positions:

(i) causing the processor to operate with the display device to display an indication that said symbol display position is overlapped by at least two displayed group wild symbols, and (ii) causing the processor to associate said overlapped symbol display position with one of a plurality of award modifiers, each of the award modifiers being configured to modify any awards associated with any winning symbol combinations associated with said overlapped symbol display position, (g) causing the processor to evaluate whether any winning symbol combinations are displayed;

(h) if any winning symbol combinations are displayed, for each displayed winning symbol combination:

(i) causing the processor to determine any awards associated with said displayed winning symbol combination; and (ii) if two or more displayed group wild symbols overlap on at least one symbol display position associated with said displayed winning symbol combination, causing the processor to modify said determined awards associated with said displayed winning symbol combination with the award modifier associated with said overlapped symbol display position; and (i) providing said determined awards.

30. The method of claim 29, which includes, for each of the plurality of groups of complementary sub-symbols, before determining whether a plurality of sets of complementary sub-symbols are displayed, (a) causing the processor to evaluate whether any winning symbol combinations are displayed and (b) providing any awards for any displayed winning symbol combinations.

31. The method of claim 29, which includes, if a plurality of group wild symbols are displayed, providing a consolation award if no winning symbol combinations result from the plurality of displayed group wild symbols.

32. The method of claim 31, wherein said consolation award is chosen from the group consisting of: a payout, a free game, an award multiplier for some or all of the symbols associated with said complementary sub-symbols, and any other award provided to the player if no winning symbol combinations result from the plurality of displayed group wild symbols.

33. The method of claim 29, wherein each symbol is associated with at least one sub-symbol.

34. The method of claim 29, wherein the method is provided through a data network.

35. The method of claim 34, wherein the data network is an internet.

* * * * *

UNITED STATES PATENT AND TRADEMARK OFFICE

CERTIFICATE OF CORRECTION

PATENT NO. : 8,002,625 B2
APPLICATION NO. : 11/558304
DATED : August 23, 2011
INVENTOR(S) : Darren Maya It is certified that error appears in the above-identified patent and that said Letters Patent is hereby corrected as shown below:

IN THE CLAIMS:

In Claim 1, column 36, line 44, replace “associated” with --associate--.

In Claim 5, column 37, line 20, replace “the same” with --a same--.

In Claim 6, column 37, line 22, replace “the group” with --at least one group--.

In Claim 7, column 37, line 24, replace “the group” with --at least one group--.

In Claim 8, column 37, line 26, delete the “,” between “which” and “includes.”

In Claim 12, column 38, line 42, replace “associated” with --associate--.

In Claim 13, column 38, line 64, delete the “,” between “whether” and “a.”

In Claim 13, column 38, line 65, between “symbols” and “displayed” insert --are--.

In Claim 16, column 39, line 18, replace “the same” with --a same--.

In Claim 17, column 39, line 20, replace “the group” with --at least one group--.

In Claim 18, column 39, line 22, replace “the group” with --at least one group--.

In Claim 22, column 40, line 35, replace “provide” with --providing--.

Signed and Sealed this
Thirteenth Day of December, 2011

David J. Kappos
*Director of the United States Patent and Trademark Office*